US012568434B2

(12) United States Patent
Kalfon et al.

(10) Patent No.: US 12,568,434 B2
(45) Date of Patent: Mar. 3, 2026

(54) DCI DECODING FOR MICRO SLEEP ACTIVATION

(71) Applicant: QUALCOMM Incorporated, San Diego, CA (US)

(72) Inventors: Shay Kalfon, Hod HaSharon (IL); Ran Iron, Tel Aviv (IL); Oleg Litvak, Ariel (IL); Shay Turel, Einat (IL); Ron Bercovich, Kfar-Saba (IL); Lior Uziel, Hod Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 937 days.

(21) Appl. No.: 17/657,936

(22) Filed: Apr. 4, 2022

(65) Prior Publication Data

US 2023/0319714 A1 Oct. 5, 2023

(51) Int. Cl.
*H04W 52/02* (2009.01)

(52) U.S. Cl.
CPC ..... *H04W 52/0229* (2013.01); *H04W 52/028* (2013.01)

(58) Field of Classification Search
CPC ........... H04W 52/028; H04W 52/0229; H04W 52/00
See application file for complete search history.

(56) References Cited

U.S. PATENT DOCUMENTS

| 10,390,305 B1 * | 8/2019 | Geekie .............. | H04W 52/0293 |
| 2014/0119287 A1 * | 5/2014 | Ren ......................... | H04L 5/001 |
| | | | 370/329 |

| 2015/0230286 A1 * | 8/2015 | Feuersaenger .... | H04W 72/1215 |
| | | | 370/252 |
| 2019/0124558 A1 * | 4/2019 | Ang ........................ | H04L 5/001 |
| 2023/0056813 A1 * | 2/2023 | Xi .......................... | H04W 76/28 |

FOREIGN PATENT DOCUMENTS

| EP | 2360864 A1 | 8/2011 | |
| GB | 2538286 A | * 11/2016 | ............... H04L 1/18 |

OTHER PUBLICATIONS

Huawel., et al., "Other Considerations on UE Power Saving", 3GPP TSG RAN WG1 Meeting #99, R1-1911874, , Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 8 Pages, XP051823056 (Year: 2019).*

(Continued)

*Primary Examiner* — Jinsong Hu
*Assistant Examiner* — Farideh Madani
(74) *Attorney, Agent, or Firm* — Procopio, Cory, Hargreaves & Savitch LLP

(57) ABSTRACT

A UE determines an activity status associated with each CC of a set of CCs based on PDCCH decoding of DCI. The set of CCs may be associated with hardware modules at the UE. An inactive set of CCs may be determined to have an inactive activity status. An active set of CCs may be determined to have an active activity status. The inactive set of CCs may be associated with a first set of hardware modules of the hardware modules. The active set of CCs may be associated with a second set of hardware modules of the hardware modules. The UE may activate a partial sleep mode at the first set of hardware modules associated with the inactive set of CCs.

28 Claims, 15 Drawing Sheets

(56)          References Cited

OTHER PUBLICATIONS

Huawei., et al., "Other Considerations on UE Power Saving", 3GPP TSG RAN WG1 Meeting #99, R1-1911874, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 8 Pages, XP051823056, 2.1 on UE's reporting information from RAN1's perspective.

International Search Report and Written Opinion—PCT/US2023/015753—ISA/EPO—Jun. 16, 2023.

* cited by examiner

400

402

Power consumption info per CC configuration

420 modem decoding

Carrier configuration

Per CC power consumption

DCI payload carrier 0 to n

410

Slot grant processing

Schedule carrier processing based on power optimization

404

Semi-static process

Dependency sources

Carrier configuration

Per CC processing time

412

μSleep managment

Processing time info per CC configuration

406

HW management

~414

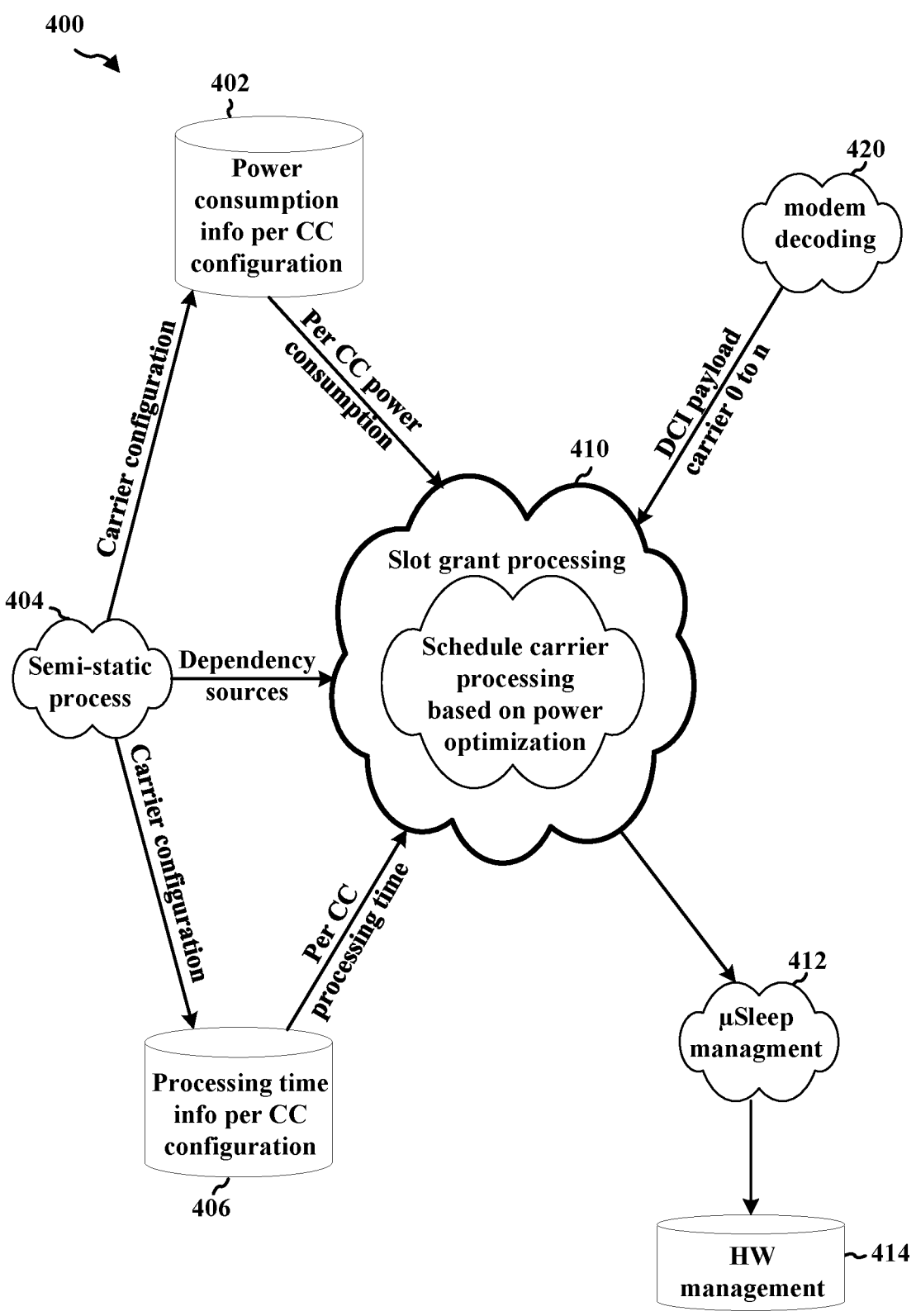

Figure 6:
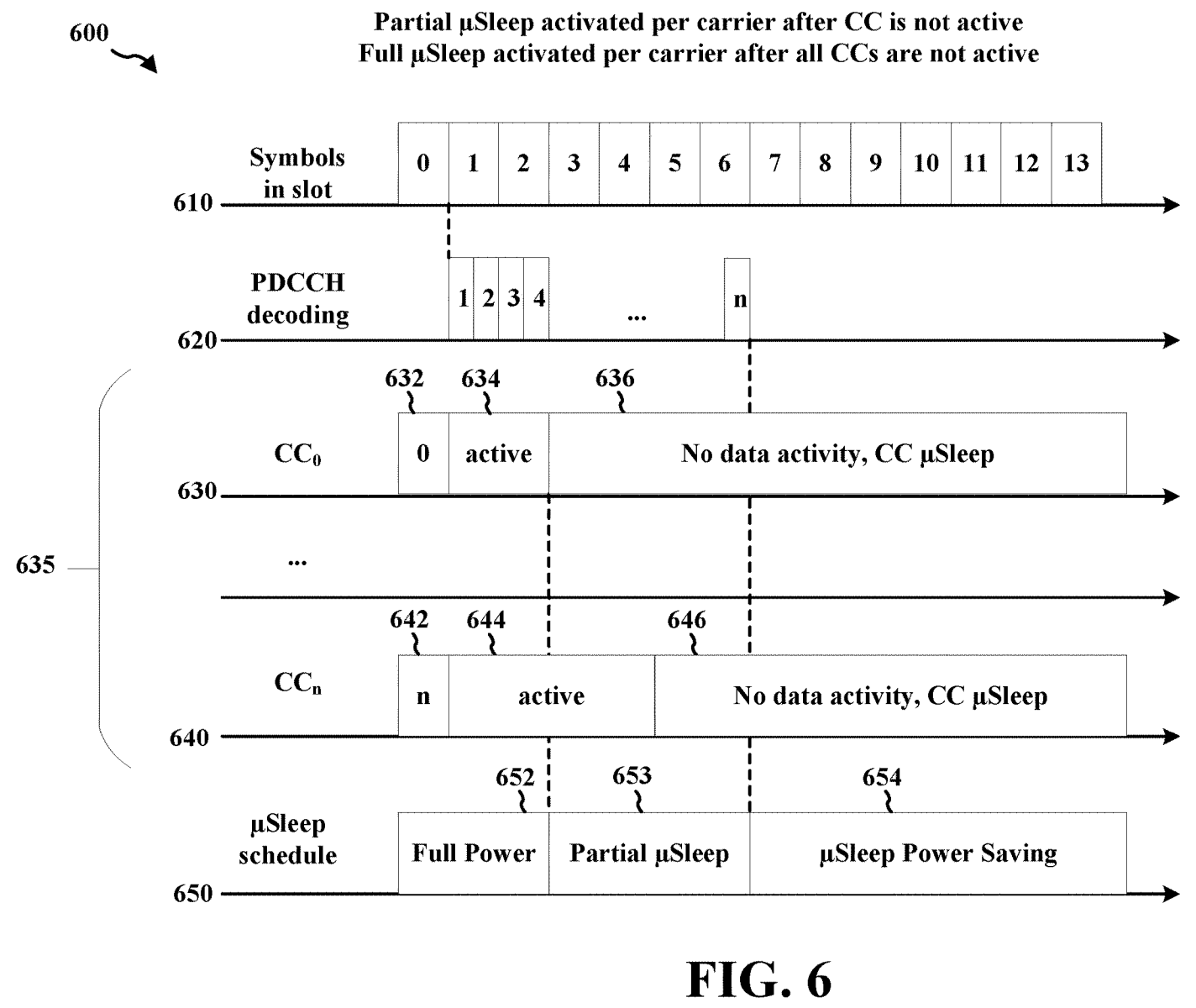

Partial μSleep activated per carrier after CC is not active
Full μSleep activated per carrier after all CCs are not active

| Symbols in slot | 0 | 1 | 2 | 3 | 4 | 5 | 6 | 7 | 8 | 9 | 10 | 11 | 12 | 13 |

610

PDCCH decoding

| 1 | 2 | 3 | 4 |        n

...

620

632    634    636

| CC₀ | 0 | active | No data activity, CC μSleep |

630

...

642    644    646

| CCₙ | n | active | No data activity, CC μSleep |

640

635

650

μSleep schedule

| Full Power | Partial μSleep | μSleep Power Saving |

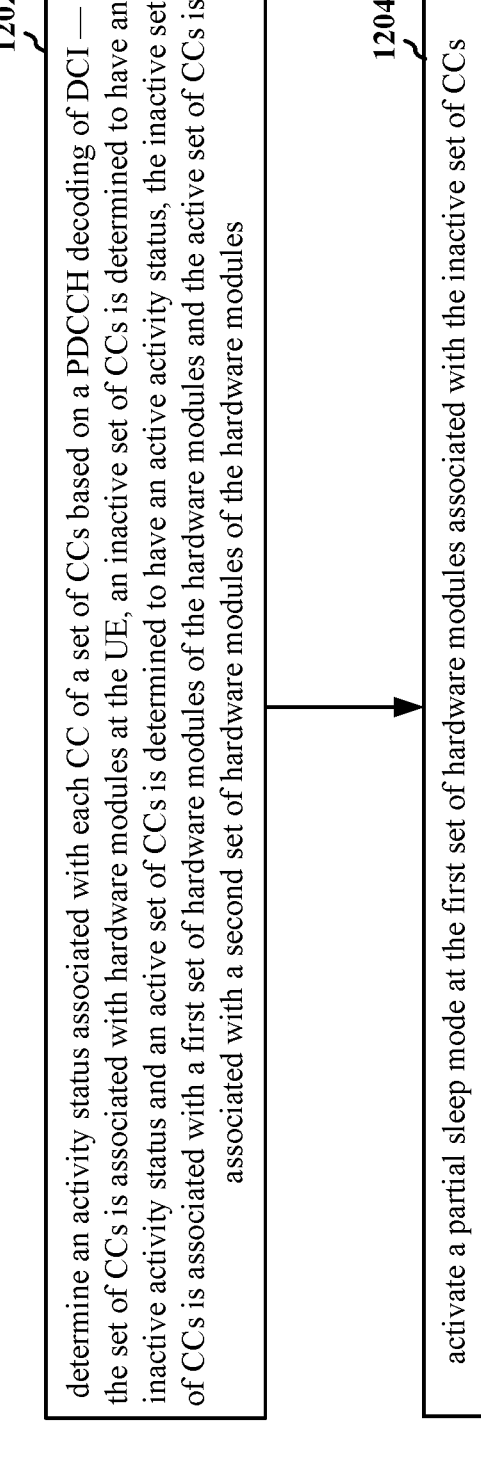

1200

1202 determine an activity status associated with each CC of a set of CCs based on a PDCCH decoding of DCI — the set of CCs is associated with hardware modules at the UE, an inactive set of CCs is determined to have an inactive activity status and an active set of CCs is determined to have an active activity status, the inactive set of CCs is associated with a first set of hardware modules of the hardware modules and the active set of CCs is associated with a second set of hardware modules of the hardware modules

1204 activate a partial sleep mode at the first set of hardware modules associated with the inactive set of CCs

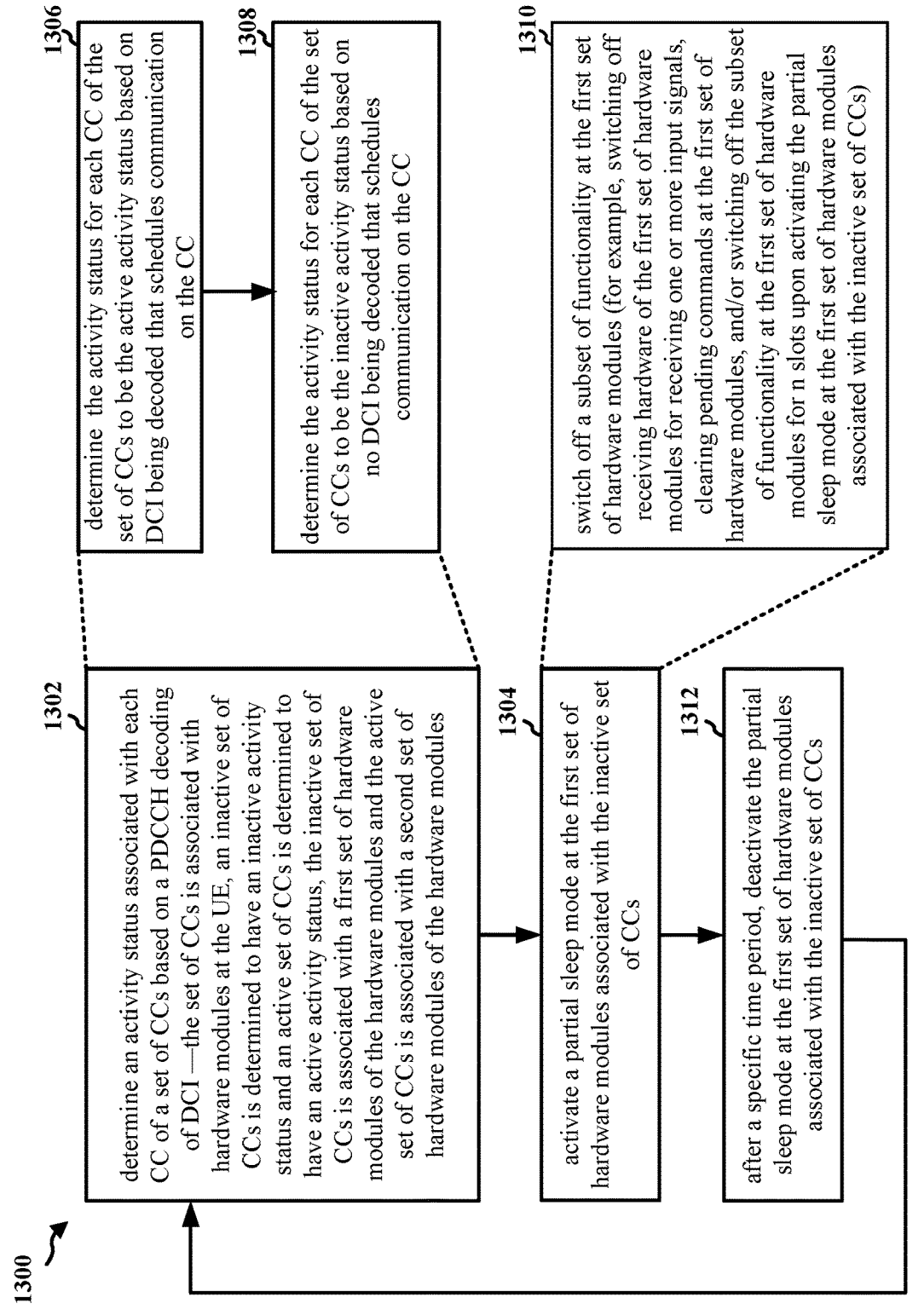

1300

1302 — determine an activity status associated with each CC of a set of CCs based on a PDCCH decoding of DCI —the set of CCs is associated with hardware modules at the UE, an inactive set of CCs is determined to have an inactive activity status and an active set of CCs is determined to have an active activity status, the inactive set of CCs is associated with a first set of hardware modules of the hardware modules and the active set of CCs is associated with a second set of hardware modules of the hardware modules 1306 — determine the activity status for each CC of the set of CCs to be the active activity status based on DCI being decoded that schedules communication on the CC 1308 — determine the activity status for each CC of the set of CCs to be the inactive activity status based on no DCI being decoded that schedules communication on the CC 1304 — activate a partial sleep mode at the first set of hardware modules associated with the inactive set of CCs 1310 — switch off a subset of functionality at the first set of hardware modules (for example, switching off receiving hardware of the first set of hardware modules for receiving one or more input signals, clearing pending commands at the first set of hardware modules, and/or switching off the subset of functionality at the first set of hardware modules for n slots upon activating the partial sleep mode at the first set of hardware modules associated with the inactive set of CCs)

1312 — after a specific time period, deactivate the partial sleep mode at the first set of hardware modules associated with the inactive set of CCs

DCI DECODING FOR MICRO SLEEP ACTIVATION

TECHNICAL FIELD

The present disclosure relates generally to communication systems, and more particularly, to a scheduling system for decoding data received by wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may be configured to switch idle (i.e., inactive) components to a microsleep (μSleep) mode (i.e., activate a μSleep mode) to save power. When switching a component to μSleep mode, a UE may switch one or more digital modules and/or one or more analog modules of the component to a μSleep mode. While such a UE may be configured to switch a component carrier (CC) group to a μSleep mode in accordance with a schedule that designates active and idle CC groups, additional power savings may be achieved by switching components of specific CCs to a μSleep mode for a period of time, such as for a number of slots in a radio frame. A UE may also schedule data for CCs to be decoded in an order to optimize power savings based on schedule dependencies, power consumption, and/or time consumption of the CCs.

In an aspect of the disclosure, a method, a computer-readable medium, and an apparatus are provided. The apparatus may have a memory and at least one processor coupled to the memory configured for wireless communication at a UE. The at least one processor may be configured to determine an activity status associated with each CC of a set of CCs based on a physical downlink control channel (PDCCH) decoding of downlink control information (DCI). The set of CCs may be associated with hardware modules at the UE. A set of CCs may be determined to have an inactive activity status during a slot when no DCI schedules a communication during the slot and a set of CCs may be determined to have an active activity status during a slot when a DCI schedules a communication during the slot. The inactive set of CCs may be associated with a first set of hardware modules of the hardware modules and the active set of CCs may be associated with a second set of hardware modules of the hardware modules. The at least one processor may be configured to activate a partial sleep mode at the first set of hardware modules associated with the inactive set of CCs.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating an example of an algorithm scheme that utilizes μSleep to reduce power consumption at a UE.

FIG. 6 is a diagram illustrating an example of an alternative μSleep scenario for a set of CCs configured to partially μSleep when a CC is not active and fully μSleep after each of the set of CCs are not active.

FIG. 12 is a flowchart of a method of wireless communication.

FIG. 13 is another flowchart of a method of wireless communication.

DETAILED DESCRIPTION

Figure 1:
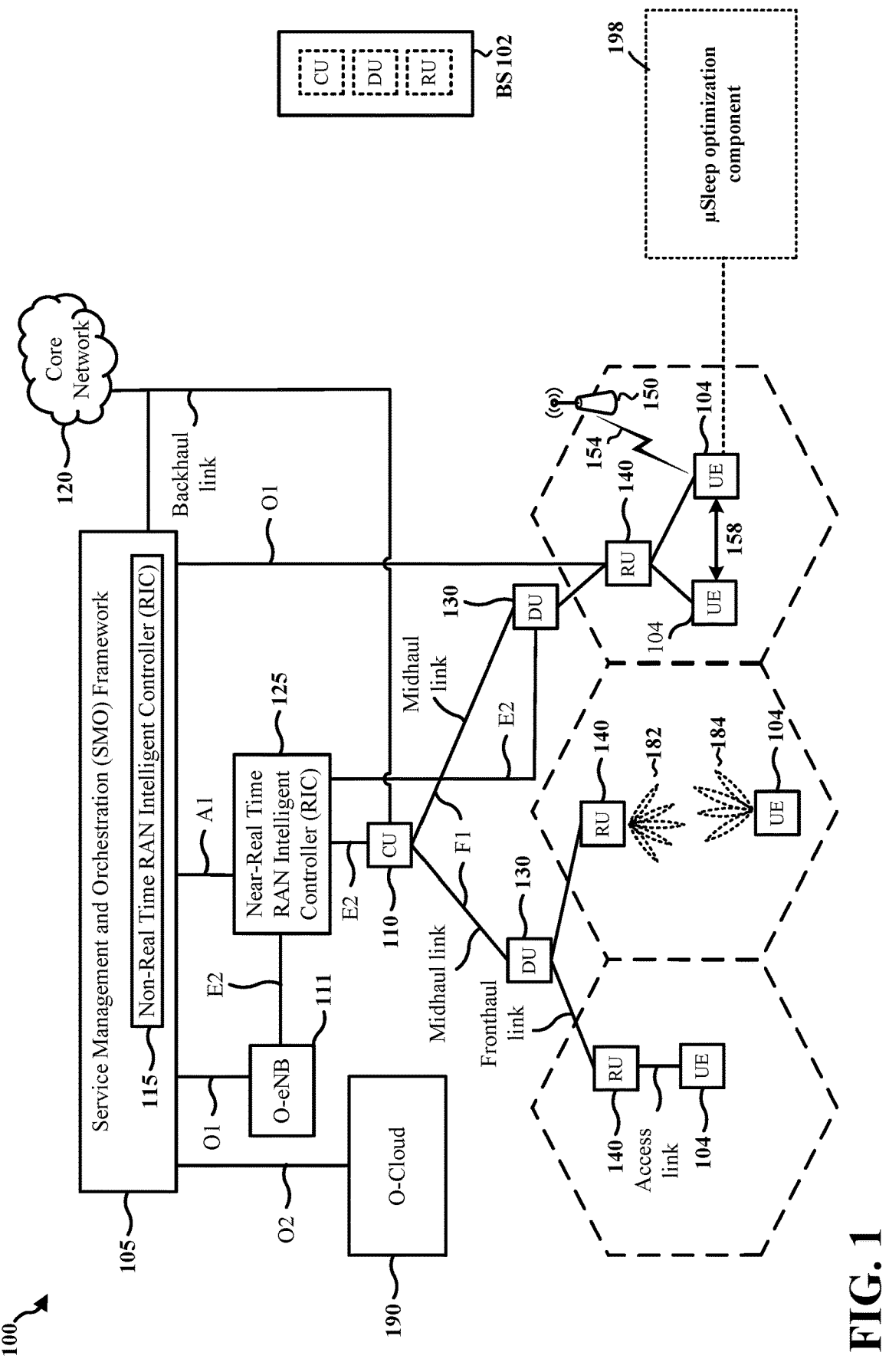
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to have a μSleep optimization component 198. Although the following description may be focused on optimizing μSleep for UE utilizing 5G NR, the concepts described herein may be applicable to other similar areas, such as LTE, LTE-A, CDMA, GSM, and other network technologies.

Figures 2A, 2B, 2C, 2D:
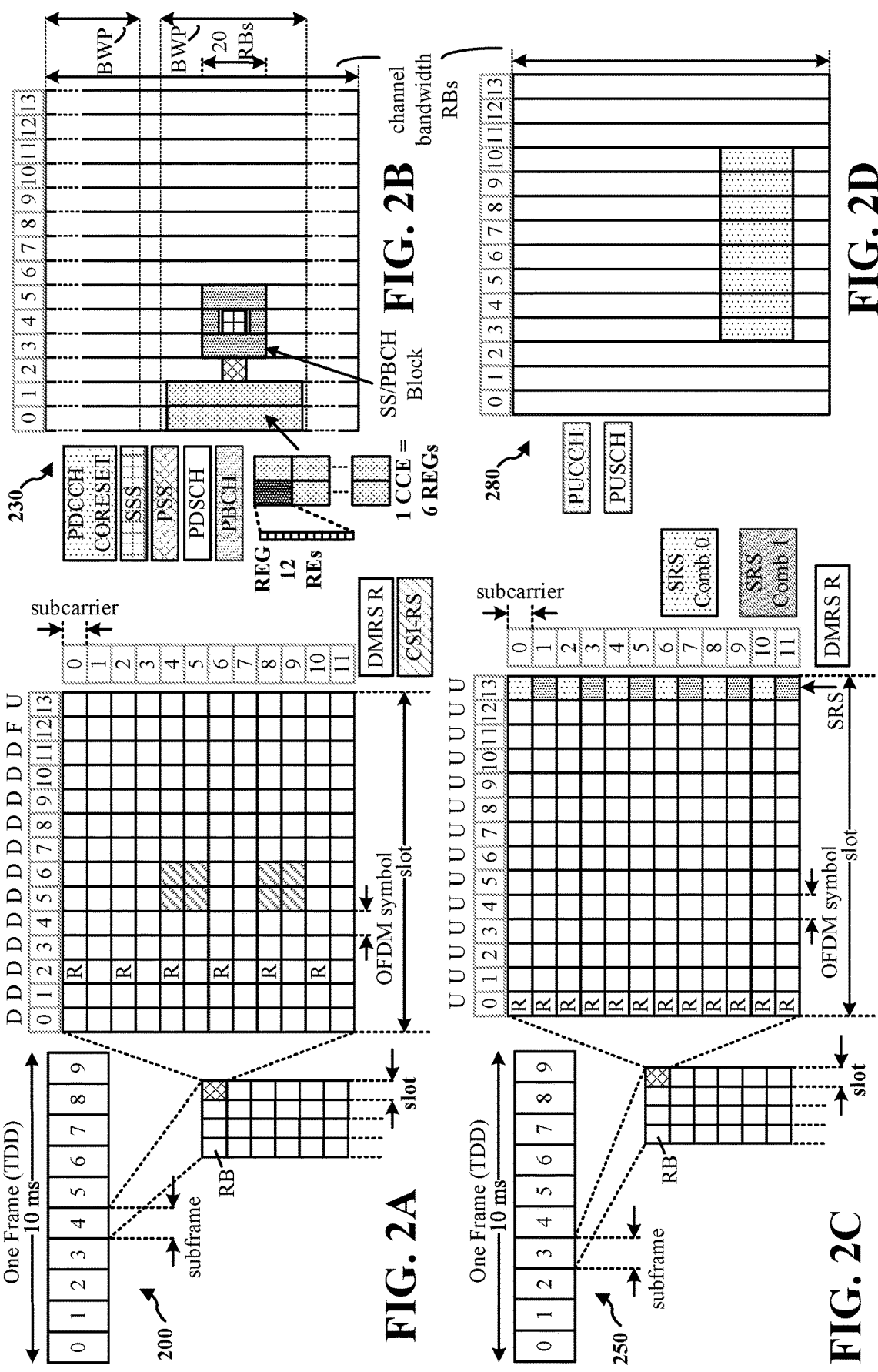
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The PDCCH carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORE-SET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
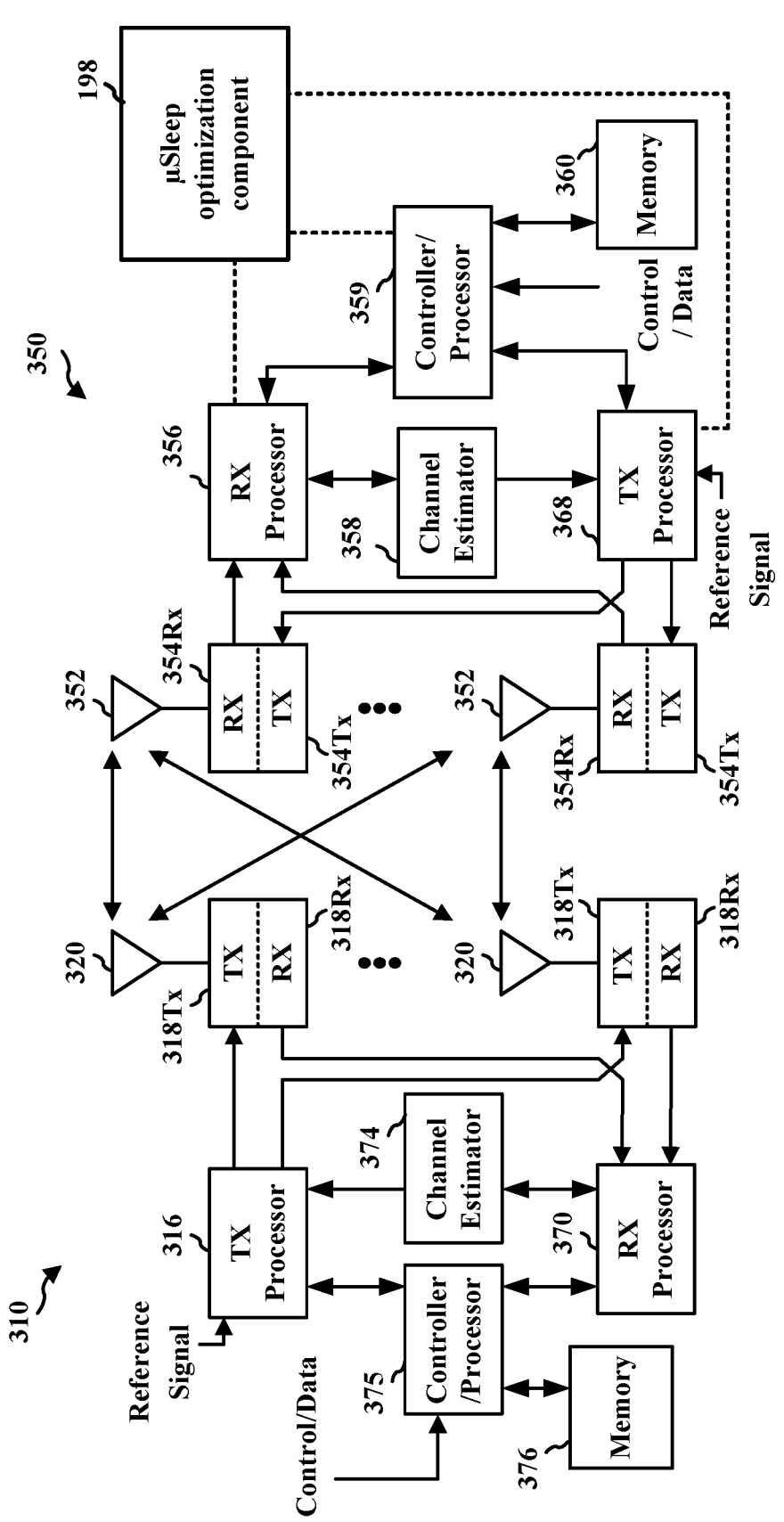
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The Tx processor 316 and the Rx processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with μSleep optimization component 198 in FIG. 1.

In NR, slot utilization may be dynamically scheduled according to a received DCI and/or network configuration for a UE. A UE may be configured to parse the received DCIs to verify scheduling information for a slot. For example, a UE may be configured to check whether DCI is received and, when DCI is received, to determine which slots are scheduled for receiving data, which symbols in each slot are scheduled for receiving data, and which slots are not scheduled for receiving data. μSleep may occur when a UE switches off its transmit (Tx) or receive (Rx) components due to inactivity of the slot. μSleep may be opportunistic, derived from parsed scheduling information indicating slot/symbol inactivity per carrier. For example, a UE may be configured to switch a subset of hardware modules to a μSleep mode to save power during idle periods, such as when a slot/symbol has no scheduled activity. A μSleep schedule may be derived from parsed scheduling information from a DCI or derived from not receiving a DCI, both of which may indicate slot/symbol activity/inactivity for a CC. A parsing order may affect the scheduling information availability timing. The parsing order may follow a "sooner the better" schedule to save opportunistic power (e.g., switch off highest power consuming elements as soon as possible using as low of a parsing power consumption as possible).

FIG. 4 illustrates an algorithm scheme 400 that may illustrate a general approach for improving μSleep and reduce an overall power consumption at a UE. Such a scheme may be used to determine a processing order of tasks to improve μSleep efficiency and manage scheduling for opportunistically switching various components of a UE to a μSleep mode.

A modem may be configured to decode 420 DCI payloads for each CC in a set of CCs from $CC_0$ to $CC_n$. The UE may use the DCI payload for at least some of the set of CCs to process grants and schedule 410 CC processing based on power optimization. A DCI may schedule CCs in a plurality of ways. In one aspect, a DCI that schedules a PDSCH may schedule the PDSCH in $K_0$ slots, where $K_0 \geq 0$ ($K_0=0$ is same slot scheduling). In another aspect, a DCI that schedules a PUSCH may schedule the PUSCH in $K_2$ slots, where $K_2>0$. A CC may be cross carrier scheduled by a DCI in one or more another scheduling CC(s). For example, via cross CC scheduling, a DCI of one CC may schedule a PDSCH/PUSCH for one or more other CCs (e.g., a DCI for $CC_0$ may schedule PDSCH/PUSCH for $CC_1$). Such cross CC scheduling relations may be known and RRC configured before a DCI is received by the UE. RRC configured cross CC schedules may be considered static or semi-static, such that a UE has a priori knowledge of the cross CC scheduling (i.e., prior to receiving the slot). For example, a UE may receive an RRC that indicates cross CC scheduling for the UE, which may be saved as a CC configuration for the UE. Such a configuration may be saved as a semi-static process 404 that may be used to schedule 410 carrier processing based on power optimization. Such information may remain static until a new RRC is received by the UE, which may indicate a different cross CC schedule. After blind decoding a set of DCIs that provide a cross CC schedule, a UE may be configured to make a decision on μSleep for a CC corresponding to the decoded DCI.

A slot may be scheduled from a DCI decoded in a previous (slot-wise) slot. In other words, a DCI may schedule a slot for a subsequent slot via cross slot scheduling. After blind decoding the entire relevant DCIs (residing in slots N-K, K≥0, $K_0$ may be used for [DL-DCI→PDSCH], $K_2$ may be used for [UL-DCI→PUSCH] scheduling delay), a UE may be configured to make a decision on μSleep for a CC corresponding to the decoded DCI. A scheduling algorithm may consider grant dependency sources of a CC to determine a μSleep schedule. For example, a UE may decode a set of DCIs that have self scheduling (i.e., a DCI in a CC scheduling for the same CC of a set of CCs), cross CC scheduling (i.e., a DCI in a CC scheduling for a different CC of the set of CCs), and/or cross slot scheduling (i.e., a DCI scheduling a subsequent slot for the same CC of the set of CCs). BWP configurations for each CC of the set of CCs may affect which CCs have self-scheduling, cross CC scheduling, or cross slot scheduling. That is, knowledge whether the BWP was reduced or changed may affect which CC provides to which CC the scheduling. For each BWP (i.e., single active per slot), a cross slot schedule may define delays of [DL-DCI→PDSCH] slots and [UL-DCI→PUSCH] slots. DCIs that may be common, which may not be related to scheduling (e.g., power control) and/or may be related to scheduling (e.g., SFI, URLLC, PS) in a non-dynamic manner, may not be required by a UE to determine an optimized μSleep schedule. Such a received DCI may not need to be decoded to optimally schedule a μSleep schedule.

One or more carriers may have semi-static processes 404 (or configurations), which may be used to determine power consumption information for a CC configuration 402, or may be used to determine processing time information for a CC configuration 406. Such semi-static processes may be defined, for example, by an RRC configuration. Power consumption information for a CC configuration 402 may be used to estimate per CC processing power to power a CC such that the CC may decode a DCI portion. For example, power consumption information for a CC configuration 402 may be calculated in terms of Watts per second, and/or may include at least some involved hardware and software power consumption. Processing time information for a CC configuration 406 may be used to estimate per CC processing time to decode the DCI portion. For example, processing time information for a CC configuration 406 may be calculated in terms of the time to reach DCI decoding (i.e., an average time period to decode a portion of a DCI or slot). Such estimates may be recalculated when a UE receives a new RRC, which may change CC configurations. For example, the UE may receive a new RRC when a new BWP configuration reduces a bandwidth used by the UE to receive data. The estimated power consumption and/or estimated processing time for a CC configuration may also be used to schedule 410 CC processing based on power optimization.

The UE may use such data to schedule 410 CC processing based on power optimization. Such a schedule may be used to optimally manage μSleep 412 for a set of CCs. For example, the schedule may determine an order that a UE may use to blind decode the PDCCH for the DCI for each CC of a set of CCs. Moreover, when a UE determines that a CC hardware component is idle/inactive in accordance with an optimized schedule, the UE may then turn off a set of hardware components via hardware management module 414, or otherwise reduce power consumption of the hardware associated with that CC hardware component. For example, for a set of hardware components that are scheduled to be inactive for a narrowband or a wideband chain, the UE may be configured to clear commands for the hardware modules and shut off the clock inputs to those hardware modules for a period of time (e.g., a number of slots). Various aspects of utilizing the algorithm scheme 400 to optimize μSleep schedules are set forth in the disclosure below.

Figure 5:
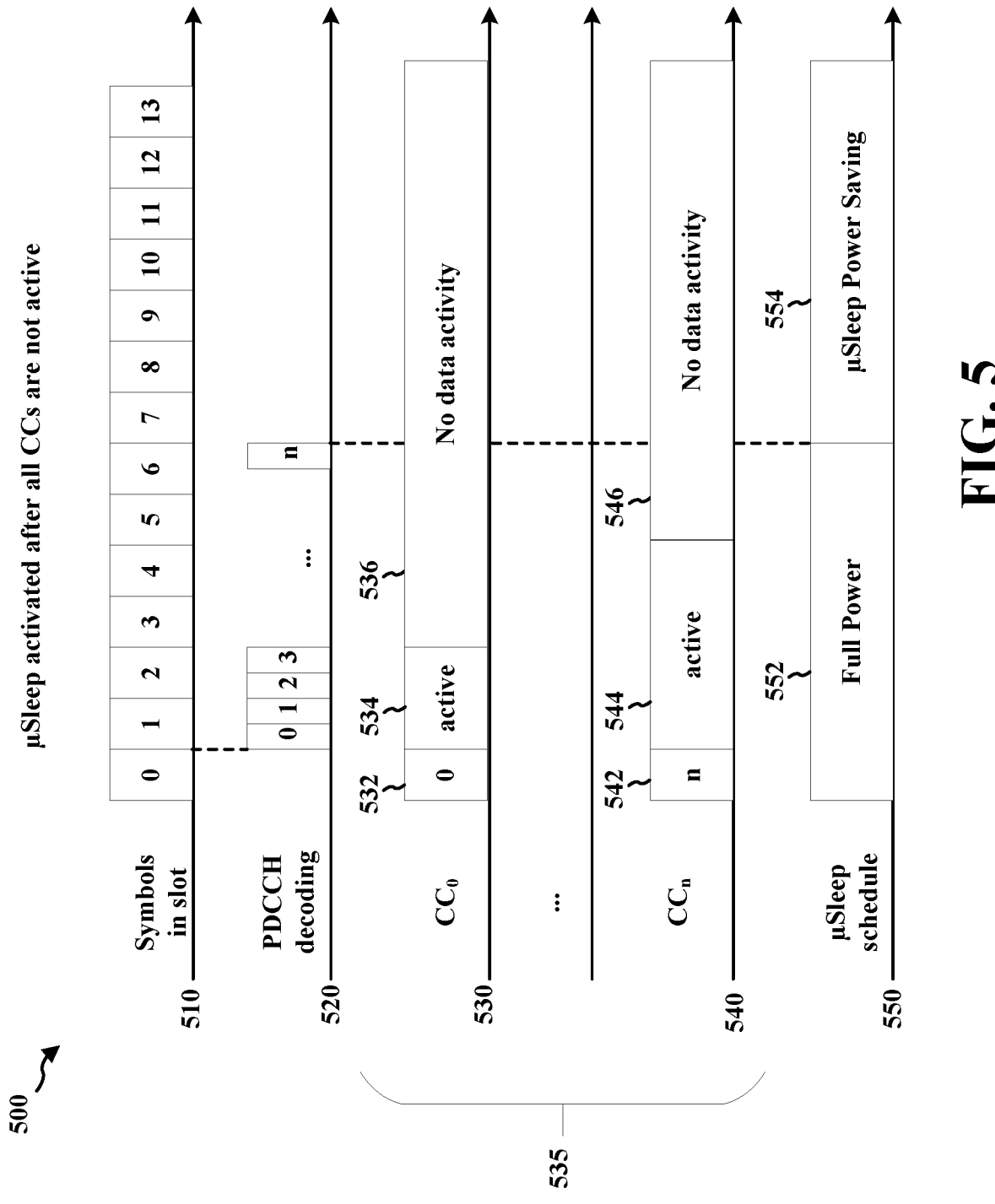
FIG. 5 is a diagram illustrating an example of a μSleep scenario for a set of CCs configured to μSleep after each of the set of CCs are not active.

FIG. 5 illustrates a μSleep scenario 500 for a set of CCs 535 from $CC_0$ to $CC_n$. A CC group (e.g., a band or a subband) may have a set of CCs 535 numbered from $CC_0$ to $CC_n$. The set of CCs 535 may correspond to all of the CCs for a CC group. There may be several CCs per band, where each CC has a PDCCH channel. The PDCCH channel may define whether there is an activity in the current slot, for example via a DCI of the PDCCH. In other words, a UE modem may decode the PDCCH 532 of $CC_0$ 530 to determine what slots/symbols are active and are inactive, and/or may decode the PDCCH 542 of $CC_n$ to determine what slots/symbols are active and are not active. A UE, such as a UE 104 in FIG. 1, may be configured to make a μSleep decision based on decoding the PDCCH for the set of CCs 535.

The symbols 510 show the slot timing for the μSleep scenario 500. The PDCCH decoding 520 shows that a modem may be configured to decode PDCCHs from 0 to n beginning at symbol 1 and ending at symbol 6. Each CC from $CC_0$ 530 to $CC_n$ 540 of the set of CCs 535 may have a PDCCH/DCI that schedules activity for the slot. A symbol for a slot may be categorized as having an active activity status or an inactive activity status, such that each CC from $CC_0$ 530 to $CC_n$ 540 of the set of CCs 535 may have a number of active symbols and a number of inactive symbols. For example, $CC_0$ 530 may have a PDCCH 532 for PDCCH 0 at symbol 0, a number of active symbols 534 at symbols 1 to 2, and a number of inactive symbols 536 at symbols 3 to 13. Similarly, $CC_n$ may have a PDCCH 542 for PDCCH n at symbol 0, a number of active symbols 544 at symbols 1 to 4, and a number of inactive symbols 546 at symbols 5 to 13. A symbol having a PDCCH, such as PDCCH 532 and PDCCH 542 may be considered an active symbol for the corresponding CC, such as the $CC_0$ and the $CC_n$, respectively. A UE may decode the PDCCH for a CC to determine which symbols are active (i.e., communication is scheduled during those symbols) and which symbols are inactive (i.e., communication is not scheduled during those symbols). As illustrated, a set of CCs may include n+1 CCs. DCI may be received on m CCs, where m≤n+1. If m<n+1, then a subset of the CCs is cross CC scheduled.

A UE may be configured to determine an activity status of a symbol of a CC as an active activity status when DCI schedules communication for the CC during that symbols, and determine an activity status of the symbol as an inactive activity status when no DCI schedules communication for the CC during that symbol. In response to the UE determining an inactive activity status for a CC at a symbol, the UE may determine whether to activate a μSleep mode for one or more hardware modules at that symbol for a period of time.

A UE may be configured to create a μSleep schedule 550 that provides full power to the set of CCs 535 for a number of symbols 552, and a reduced power consumption of hardware (e.g., switches the hardware to μSleep mode, switches off a subset of functionality at the hardware) for the set of CCs 535 for a number of symbols 554 when there is no data activity across each of the set of CCs. Once all PDCCH CCs are decoded, a UE may be configured to perform an activity check. If the UE determines that all of the PDCCH CCs show no activity for the current slot (e.g., at symbol 7), the UE may activate μSleep and at least some of the receiver hardware may be turned off or may otherwise have its power reduced (e.g., by shutting off clock inputs to the hardware). Otherwise, if the UE determines that there is an activity in at least one CC for the current slot (e.g., at symbol 4), the UE may be configured to keep all CCs of the set of CCs 535 active. After the UE activates a μSleep mode (e.g. at symbol 7), the UE may be configured to deactivate the μSleep mode in response to any suitable trigger, for example in response to receiving a wake-up signal or in response to a scheduled transmission in a future slot. For example, a UE may determine that a set of CCs are not scheduled to have any activity for a specific period of time (e.g., for n slots), and in response the UE may activate the μSleep mode for the specific period of time before deactivating the μSleep mode.

A UE may be configured to only switch hardware corresponding to a CC to a μSleep mode when the UE determines that there is enough time to reduce power consumption of the hardware corresponding to the set of CCs 535. For example, where a UE may require two symbols to activate a μSleep mode at hardware associated with the set of CCs 535, the UE may be configured to activate a μSleep mode at hardware associated with the set of CCs 535 after the UE determines that there is no scheduled activity for any of the set of CCs 535 within the next two symbols. A UE may determine that there is no scheduled activity for any of the set of CCs 535 starting at symbol 7 for μSleep schedule 550. In other words, the UE may be configured to provide full power to the set of CCs 535 during symbols 552 by determining that, during symbols 552, any one CC of the set of CCs 535 from $CC_0$ to $CC_n$ is active. In one aspect, the UE may be configured to perform an activity check after all of the PDCCH CCs are decoded.

The UE may be configured to activate μSleep mode at hardware modules associated with the set of CCs 535 after PDCCH of all carriers are decoded and when all carriers are not active. In other words, when the UE determines that all of the PDCCH CCs show no activity for the current symbol, the UE may activate μSleep for the set of CCs 535 (e.g., reducing power consumption of receiver hardware for the set of CCs 535). When the UE determines that at least one CC of the set of CCs is active for the current symbol, the UE may refrain from activating μSleep. The sleep schedule 550 may allow μSleep power saving when all of the CCs 535 have no activity. Such a configuration may be useful to trigger a μSleep across a set of CCs when all of the CCs in a CC group do not have any activity. However, if a specific CC has no PDCCH activity, there may not be power savings upon any CC in the sub-band staying active. In other words, if a specific CC has no activity for a period of symbols, such as $CC_0$ during symbols 3-6, the μSleep schedule 550 may not provide any power savings for the $CC_0$ during symbols 3-6, even if $CC_0$ may be inactive during those symbols.

While the μSleep schedule 550 may conserve power to a UE by activating a μSleep mode for hardware components associated with the set of CCs 535 after the UE detects that there is no data activity across all of the CCs, additional power savings may be realized by implementing a partial μSleep mode when some CCs are scheduled to be inactive while other CCs are scheduled to be active. Such a partial μSleep may be for modules related to the specific CC that is scheduled to be inactive.

FIG. 6 illustrates a μSleep scenario 600 for a set of CCs 635. Similar to the μSleep scenario 500 in FIG. 5, the symbols 610 show the timing for the μSleep scenario 600. The PDCCH decoding 620 shows that a modem may be configured to decode PDCCHs from 0 to n beginning at symbol 1 and ending at symbol 6. The $CC_0$ 630 may have a PDCCH 632 for PDCCH 0 at symbol 0, a number of active symbols 634 at symbols 1 to 2, and a number of inactive symbols 636 at symbols 3 to 13 while the $CC_n$ 640 may have a PDCCH 642 for PDCCH n at symbol 0, a number of active symbols 644 at symbols 1 to 4, and a number of inactive symbols 646 at symbols 5 to 13.

A UE, such as a UE 104 in FIG. 1, may be configured to create a μSleep schedule 650 that provides full power to the set of CCs 635 for a number of symbols 652, activates a partial μSleep mode for hardware associated with the set of CCs 635 for a number of symbols 653, and activates a full μSleep mode for hardware associated with the set of CCs 635 for a number of symbols 654 when there is no data activity across each CC of the set of CCs 635. A partial μSleep mode (i.e., partial sleep mode) means that some hardware modules associated with CCs of a CC group, or some CC groups of a set of CC groups, may have a μSleep mode activated while other hardware modules may not have a μSleep mode activated. Specifically, when the UE determines that there is no data activity for the inactive symbols 636 for $CC_0$, the UE may be configured to put $CC_0$ to μSleep starting at symbol 3 (i.e., activate a μSleep mode at hardware modules corresponding to $CC_0$) while $CC_n$ is still active at symbol 3. Likewise, when the UE determines that there is no data activity for the inactive symbols 646 for $CC_n$, the UE may be configured to put $CC_n$ to μSleep starting at symbol 5 (i.e., activate a μSleep mode at hardware modules corresponding to $CC_n$) while other CCs of the set of CCs 635 may still be active. In other words, the UE may be configured to activate a partial μSleep mode for a period of time, such as a number of symbols 653 at symbols 3 to 6, before activating a full μSleep mode for a number of symbols 654 at symbols 7 to 13. A UE may be configured to only switch hardware corresponding to a CC from an active mode to a μSleep mode when the UE determines that there is enough time to reduce power consumption of the hardware corresponding to the CC. For example, where a UE may require two symbols to activate a μSleep mode at hardware associated with a CC, the UE may be configured to activate a μSleep mode at hardware associated with a CC after the UE determines that there is no scheduled activity for a CC within the next two symbols. By putting CCs of the set of CCs 635 to μSleep individually, the UE may save power by using a protocol-based decision on power consuming units. Such a software-based solution may save tens of milliwatts in typical scenarios of DL and UE reception. The UE may be configured to deactivate the μSleep mode after a specific period of time. For example, where the decoded DCI has not scheduled any activity for the set of CCs 635 until after n slots, the UE may be configured to deactivate the μSleep mode after n slots. In another aspect, the UE may be configured to deactivate the μSleep mode in response to receiving a wake-up signal.

The UE may be configured to put an entire CC group corresponding with the set of CCs 635 to μSleep starting at symbol 7 when the UE determines that there is no scheduled activity across each of the CCs of the set of CCs 635 for that CC group starting at symbol 7. In other words, the UE may be configured to activate μSleep across narrow-band hardware components per CC when the PDCCH of the CC indicates that a symbol for a CC of a CC group is inactive while other CCs for the CC group are active, and may be configured to activate a μSleep across wide-band/analog-to-digital/radio frequency antenna hardware components when the PDCCH of the set of CCs 635 indicates that all CCs of a CC group are inactive.

Since the UE may not know which symbols are active or inactive until after the UE decodes the DCI for each of the CCs of the set of CCs, the UE may be configured to first blind-decode the entire set of relevant DCIs for the set of CCs to provide the UE with a priori knowledge of which symbols are active and are inactive for each CC of the set of CCs. Since the CC activity may be detected per channel base, a UE may be configured to introduce partial μSleep for modules related to a specific CC that does not have data activity for a symbol. A UE may be configured to support reducing power consumption of (i.e., switching to μSleep mode) hardware modules related to a specific CC and/or reducing power consumption of hardware modules related to a specific CC group, band, or subband. Narrowband μSleep may be activated per carrier after PDCCH of the carrier is decoded. A UE may be configured to activate a μSleep mode at hardware modules related to a specific CC at inactivity time of that CC, and/or may be configured to activate a μSleep mode at hardware modules related to all CCs of a specific CC group at inactivity time of that CC group. A UE may be configured to activate wideband, analog-to-digital (ADC), and/or RF μSleep when all carriers of a CC group or sub-band are determined by the UE to be inactive.

Figure 7:
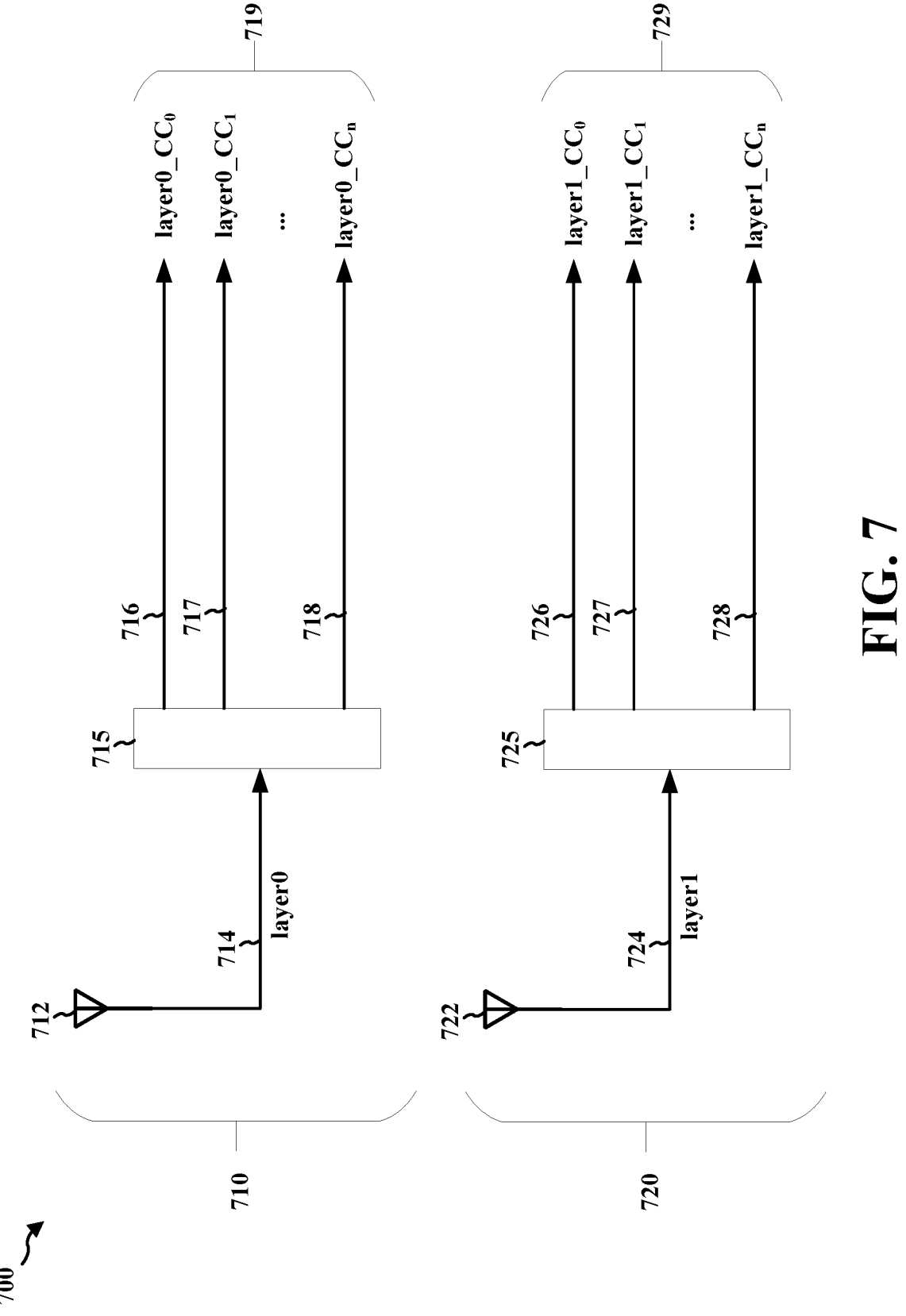
FIG. 7 is a diagram illustrating an example of a pair of CC groups each having a set of CCs.

FIG. 7 shows a schematic 700 of a CC group layer0 710 and a CC group layer1 720. The CC group layer0 710 may represent a first band of a UE, such as UE 104 in FIG. 1, and the CC group layer1 720 may represent a second band of the UE. The CC group layer0 710 may have an antenna 712, a wideband chain of hardware 714, and a splitter 715 that splits a signal from the output of the chain of hardware 714 to inputs of a set of CCs 719. The inputs of the set of CCs 719 may include an input to a chain of hardware 716 for layer0_$CC_0$, an input to a chain of hardware 717 for layer0_$CC_1$, and an input to a chain of hardware 718 for layer0_$CC_n$. Similarly, the CC group layer1 720 may have an antenna 722, a wideband chain of hardware 724, and a splitter 725 that splits a signal from the output of the chain of hardware 724 to inputs of a set of CCs 729. The inputs of the set of CCs 729 may include an input to a chain of hardware 726 for layer1_$CC_0$, an input to a chain of hardware 727 for layer1_$CC_1$, and an input to a chain of hardware 728 for layer1_$CC_n$. A UE may construct a sleep scenario for the set of CCs 719 or the set of CCs 729 such as the sleep scenario 600 in FIG. 6 to determine what hardware modules may be switched to $\mu$Sleep mode in accordance with a $\mu$Sleep schedule.

Figure 8:
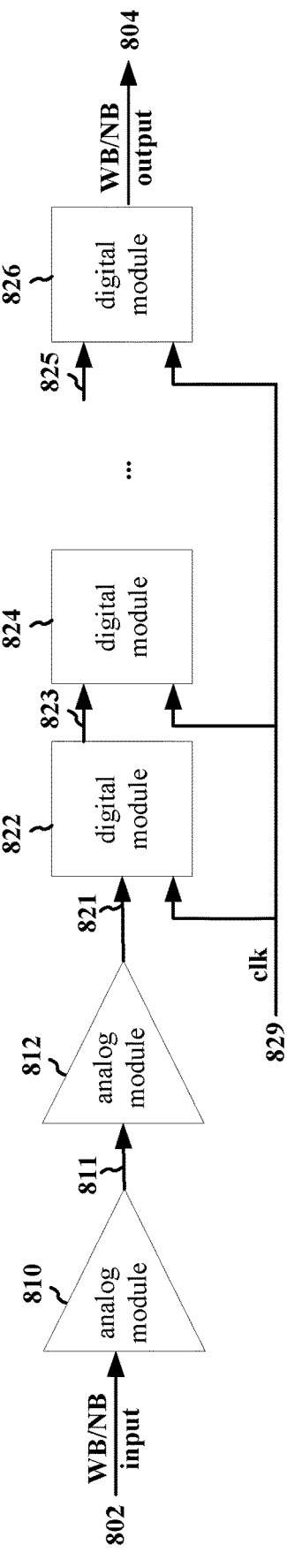
FIG. 8 is a diagram illustrating an example of a chain of hardware for a wideband or a narrowband component.

FIG. 8 shows an example of a chain of hardware 800, such as the wideband chain of hardware 714 for the CC group layer0 in FIG. 7 or the narrowband chain of hardware 716 for the $CC_0$ of the CC group layer0. The chain of hardware 800 may include an input 802 to the wideband or narrowband hardware chain, an output 804 to the wideband or narrowband hardware chain, and a series of hardware modules or components in between the input 802 and the output 804. The hardware modules may include at least one analog module 810, 812 and at least one digital module 822, 824, and 826. The analog modules 810, 812 may include, for example, amplifiers or ADCs. The digital modules 822, 824, and 826 may include, for example, mappers, wideband measurements, decimators, aligners, FDRSB filters, decoders, samples of decimation, VSRC, measurements, gates, rotators, notches, data transfer rate (DTR) narrow band chains, DTR wide band chains, and phase-locked loops (PLLs). Each of the digital modules 822, 824, and 826 may have a pending command inputs 821, 823, and 825, respectively, and a shared clock input 829. When a UE is configured to "turn off" a chain of hardware components for a full or partial $\mu$Sleep, the UE may be configured to clear pending hardware commands (e.g., command inputs 821, 823, and 825) and close clock inputs (e.g., open a circuit between a clock and the clock input 829) to the chain of hardware components for a period of time, such as until a wake command is received or until a scheduled slot for communication with a device. The UE may also be configured to close any inputs (e.g., open a circuit) to analog devices, such as the input 802 to the analog module 810 and/or the input 811 to the analog module 812. The UE may be configured to close any other device inputs connected to the chain of hardware 800. In other words, switching a hardware to $\mu$Sleep mode (i.e., activating a $\mu$Sleep mode or a partial sleep mode) may comprise switching off one or more functions of the hardware module (i.e., switching off a subset of functionality), such as closing one or more inputs to the hardware module (including a power input) or clearing a pending hardware command (i.e., setting an input). While the chain of hardware 800 may be shown as having a single input and a single output for a series of hardware modules connected in series with one another, a chain of hardware may have hardware modules that are connected in parallel with one another and may have a plurality of inputs and/or a plurality of outputs.

Referring back to FIG. 6, a UE may determine that the $CC_0$ 630 is inactive during symbol 4, as symbol 4 is within the inactive symbols 636 of $CC_0$ 630, and may determine that the $CC_n$ is active during symbol 4, as symbol 4 is within the active symbols 644 of $CC_n$ 640. The $CC_0$ in FIG. 6 may be representative of the layer0_$CC_0$ in FIG. 7, while the $CC_n$ in FIG. 6 may be representative of the layer0_$CC_n$ in FIG. 7. The chain of hardware 714 of the layer0_$CC_0$ in FIG. 7 may include the chain of hardware 800 in FIG. 8. Thus, in response to a UE, such as the UE 104 in FIG. 1, determining that the $CC_0$ 630 in FIG. 6 is inactive during symbol 4, the UE may be configured to put the chain of hardware 716 in FIG. 7 for layer0_$CC_0$ in a $\mu$Sleep mode. For example, the UE may be configured to clear one or more hardware commands to the chain of hardware 716 for layer0_$CC_0$, such as the command inputs 821, 823, and 825 in FIG. 8. The UE may be configured to close one or more clock inputs to the chain of hardware 716 for layer0_$CC_0$, such as the clock input 829, by opening a circuit between a clock and the clock input 829. The UE may be configured to close one or more inputs to analog modules, such as the input 802 to the analog module 810. In other words, the UE may be configured to render one or more hardware components of the chain of hardware 716 of layer0_$CC_0$ in FIG. 7 dormant to minimize a power drain of hardware components associated with $CC_0$ 630 in FIG. 6, while allowing other hardware, such as the chain of hardware 718 of layer1_$CC_n$ in FIG. 7 to operate.

In another aspect, referring back to FIG. 6, a UE may determine that the $CC_0$ 630 is inactive during symbol 5, as symbol 5 is within the inactive symbols 636 of $CC_0$ 630, and may determine that the $CC_n$ 640 is active during symbol 5, as symbol 5 is within the inactive symbols 646 of $CC_n$ 640. The $CC_0$ in FIG. 6 may be representative of the layer0_$CC_0$ in FIG. 7, while the $CC_n$ in FIG. 6 may be representative of the layer0_$CC_n$ in FIG. 7. In response to a UE, such as a UE 104 in FIG. 1, determining that the $CC_0$ 630 and $CC_n$ 640 in FIG. 6 are both inactive during symbol 5, the UE may be configured to put the chain of hardware 718 for layer0_$CC_n$ in FIG. 7 to a $\mu$Sleep mode in addition to the chain of hardware 716 for layer0_$CC_0$, for example by clearing command inputs, closing clock inputs, and/or closing inputs to digital modules associated with layer0_$CC_n$ and layer0_$CC_0$.

In another aspect, referring back to FIG. 6, a UE may determine that all CCs of the set of CCs 635 are inactive during symbol 7, as symbol 7 may be within the inactive symbols for all CCs of the set of CCs 635. The set of CCs 635 in FIG. 6 may be representative of the set of CCs 719 of layer0 in FIG. 7. The UE, such as a UE 104 in FIG. 1, may be configured to determine that all of the set of CCs 719 in FIG. 7 are inactive, which means that all of the set of CCs 719 for the CC group layer0 710 are inactive. The UE may be configured to put the CC group layer0 710 to $\mu$Sleep mode, including the narrowband chain of hardware 716 for the layer0_$CC_0$, the narrowband chain of hardware 717 for the layer0_$CC_1$, the narrowband chain of hardware 718 for the layer0_$CC_n$, and the wideband chain of hardware 714 for the layer0 710. Similarly, the UE may be configured to clear command inputs, close clock inputs, and/or close inputs to modules of the hardware chains. In other words, a UE may be configured to switch off the hardware components of the entire CC group layer0 710 in response to detecting that the CC group layer0 710 is inactive (e.g., all CCs have no activity), while continuing to receive data using the CC group layer1 720 in response to detecting that the CC group layer1 720 is active (e.g., at least one CC has activity).

While the schematic 700 shows two CC groups, a UE may have any number of CC groups. A UE may be configured to determine one set of CC groups as being active (e.g., at least one CC has activity) and another set of CC groups as being inactive (e.g., all CCs have no activity). Additionally, or alternatively, such a UE may be configured to put the inactive set of CC groups into a $\mu$Sleep mode while the active set of CC groups may continue to receive data. Each CC group may have a wideband set of hardware shared by a set of CCs and a narrowband set of hardware associated with each CC of the set of CCs. Such a UE may be configured to activate a partial sleep mode at hardware modules associated with inactive CC groups and unassociated with active CC groups, allowing a UE to conserve power by turning off hardware components associated with a subset of available, but idle, bands or subbands of the UE.

Figure 9:
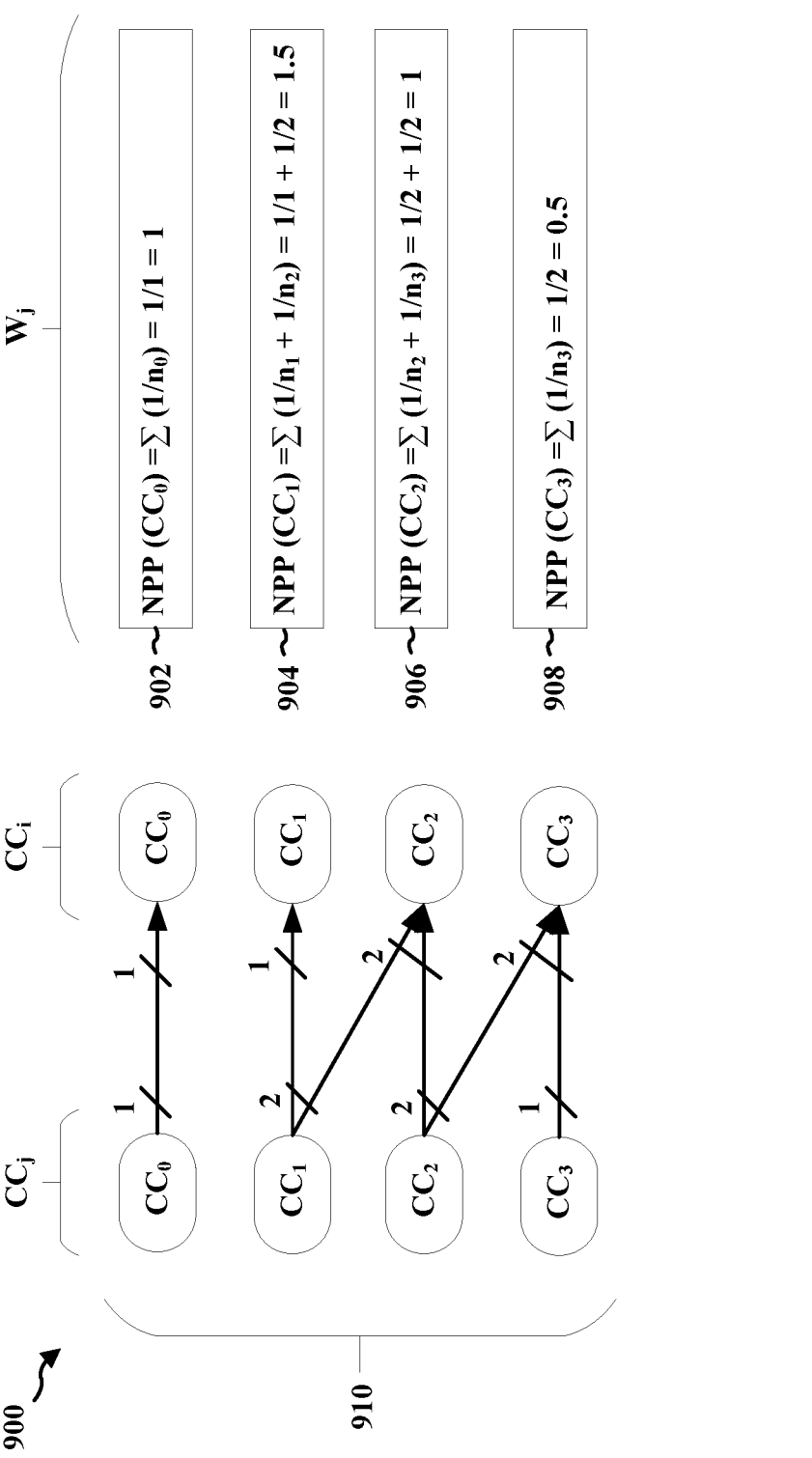
FIG. 9 is a diagram illustrating a logical example of a set of CCs configured to schedule at least some of the set of CCs.

FIG. 9 illustrates a logical example 900 to determine a weighted scheduling order $W_j$ of a set of CCs 910 that are configured to schedule at least some of the set of CCs 910, assuming similar processing time and power consumption per CC. The logical example 900 illustrates cross CC scheduling for $CC_0$, $CC_1$, $CC_2$, and $CC_3$. Such cross CC scheduling may be RRC configured (i.e., static relation or semi-static relation) and therefore known prior to receiving the slot. Such cross CC scheduling may be determined by decoding DCI. The cross CC scheduling may have grant dependencies where each CC of the set of CCs may schedule a set of CCs. Here, $CC_0$ schedules $CC_0$, $CC_1$ schedules $CC_1$ and $CC_2$, $CC_2$ schedules $CC_2$ and $CC_3$, and $CC_3$ schedules $CC_3$. The CCs that schedule other CCs may be referred to as $CC_j$, and the CCs that are scheduled may be referred to as $CC_i$. In other words, $CC_0$ is scheduled only by $CC_0$ (self-scheduled by $CC_0$), $CC_1$ is scheduled only by $CC_1$ (self-scheduled by $CC_1$), $CC_2$ is scheduled by $CC_1$ and $CC_2$ ($CC_2$ is cross CC scheduled by $CC_1$), and $CC_3$ is scheduled by $CC_2$ and $CC_3$ ($CC_3$ is cross CC scheduled by $CC_2$).

A UE, such as a UE 104 of FIG. 1, may be configured to count the number of grant providers and/or the number of grant dependencies. For example, the UE may determine that $CC_0$ provides 1 grant to $CC_0$, that $CC_1$ provides 2 grants (one grant to $CC_1$ and one grant to $CC_2$), that $CC_2$ provides 2 grants (one grant to $CC_2$ and one grant to $CC_3$), and that $CC_3$ provides 1 grant to $CC_3$. The UE may also determine that $CC_0$ depends on 1 grant from $CC_0$, that $CC_1$ depends on 1 grant from $CC_1$, that $CC_2$ depends on 2 grants (one grant from $CC_2$ and one grant from $CC_1$), and that $CC_3$ depends on 2 grants (one grant from $CC_2$ and one grant from $CC_3$). The UE may then be configured to calculate a node priority per CC (NPP) based on the grant dependents and the number of providers for each grant dependent. The NPP may also be referred to as a weight $W_j$. A sample NPP calculation is shown for each of the CCs of the set of CCs 910 to the right of the corresponding CC. In other words, an NPP calculation 902 is shown for $CC_0$, an NPP calculation 904 is shown for $CC_1$, an NPP calculation 906 is shown for $CC_2$, and an NPP calculation 908 is shown for $CC_3$.

Each $CC_i$ of the set of CCs 910 may be associated with a number $n_i$ of CCs that schedule the CC. For example, $CC_0$ may be associated with $n_0=1$ CCs ($CC_0$) that schedule $CC_0$. $CC_1$ may be associated with $n_1=1$ CC ($CC_1$) that schedule $CC_1$. $CC_2$ may be associated with $n_2=2$ CCs ($CC_1$, $CC_2$) that schedule $CC_2$. $CC_3$ may be associated with $n_3=2$ CCs ($CC_2$, $CC_3$) that schedule $CC_3$.

Each $CC_j$ of the set of CCs 910 may schedule a set of CCs $S_i$. For example, $CC_0$ may schedule a set $S_0$ of $CC_0$. $CC_1$ may schedule a set $S_1$ of $CC_1$ and $CC_2$. $CC_2$ may schedule a set $S_2$ of $CC_2$ and $CC_3$. $CC_3$ may schedule a set $S_3$ of $CC_3$.

Each $CC_j$ of the set of CCs 910 may be associated with a weight $W_j$ equal to a sum of $1/n_i$ for each $CC_i$ in each set of CCs $S_i$.

For $CC_0$, the NPP calculation 902 may add one NPP variable since $S_0$ has one CC. The NPP variable may be calculated as $1/n_0$, where no is the number of CCs that provide a grant to the provided $CC_0$. Here, since $1/n_0=1$, the weighted value of $CC_0$'s NPP may be 1.

For $CC_1$, the NPP calculation 904 may add two NPP variables since $S_1$ has two CCs. The NPP variable for the first provision may be calculated as $1/n_1$, where $n_1$ is the number of CCs that provide a grant to the first provided $CC_1$, and the NPP variable for the second provision may be calculated as $1/n_2$, where $n_2$ is the number of CCs that provide a grant to the second provided $CC_2$. Here, since $1/n_1=1$ and $1/n_2=1/2$, the weighted value of $CC_1$'s NPP may be 1.5.

For $CC_2$, the NPP calculation 906 may add two NPP variables since $S_2=2$. The NPP variable for the first provision may be calculated as $1/n_2$, where $n_2$ is the number of CCs that provide a grant to the first provided $CC_2$, and the NPP variable for the second provision may be calculated as $1/n_3$, where $n_3$ is the number of CCs that provide a grant to the second provided $CC_3$. Here, since $1/n_2=1/2$ and $1/n_3=1/2$, the weighted value of $CC_2$'s NPP may be 1.

For $CC_3$, the NPP calculation 908 may add one NPP variable since $S_3=1$. The NPP variable for the provision may be calculated as $1/n_3$, where $n_3$ is the number of CCs that provide a grant to the provided $CC_3$. Here, since $1/n_3=1/2$, the weighted value of $CC_3$'s NPP may be 0.5.

A CC order may be based on the weight $W_j$ for each $CC_j$ of the set of CCs 910. In other words, the weighted values may be used to determine a scheduling order for decoding DCI from each CC of the set of CCs 910, from highest to lowest. Here, a UE with such calculated weighted values may decode the PDCCH for the DCI from $CC_1$ first before decoding PDCCH from other CCs, as $CC_1$ has the highest weighted value of 1.5. Such a UE may also schedule data from $CC_1$ to be decoded first, eliminating the need for the UE to wait for the grant to $CC_2$ from $CC_1$ before decoding $CC_2$ (after the UE decodes the PDCCH from $CC_1$). The UE may be configured to put a CC to μSleep after the UE decodes each highest NPP CC of the set of CCs 910. Here, the UE may put $CC_1$ to μSleep after the UE decodes $CC_1$ as the first CC decoded CC of the set of CCs 910. The UE may be configured to sort the NPPs in ascending order (i.e., maximal to minimal), and may keep the order as an A-priory processing order.

Figure 10:
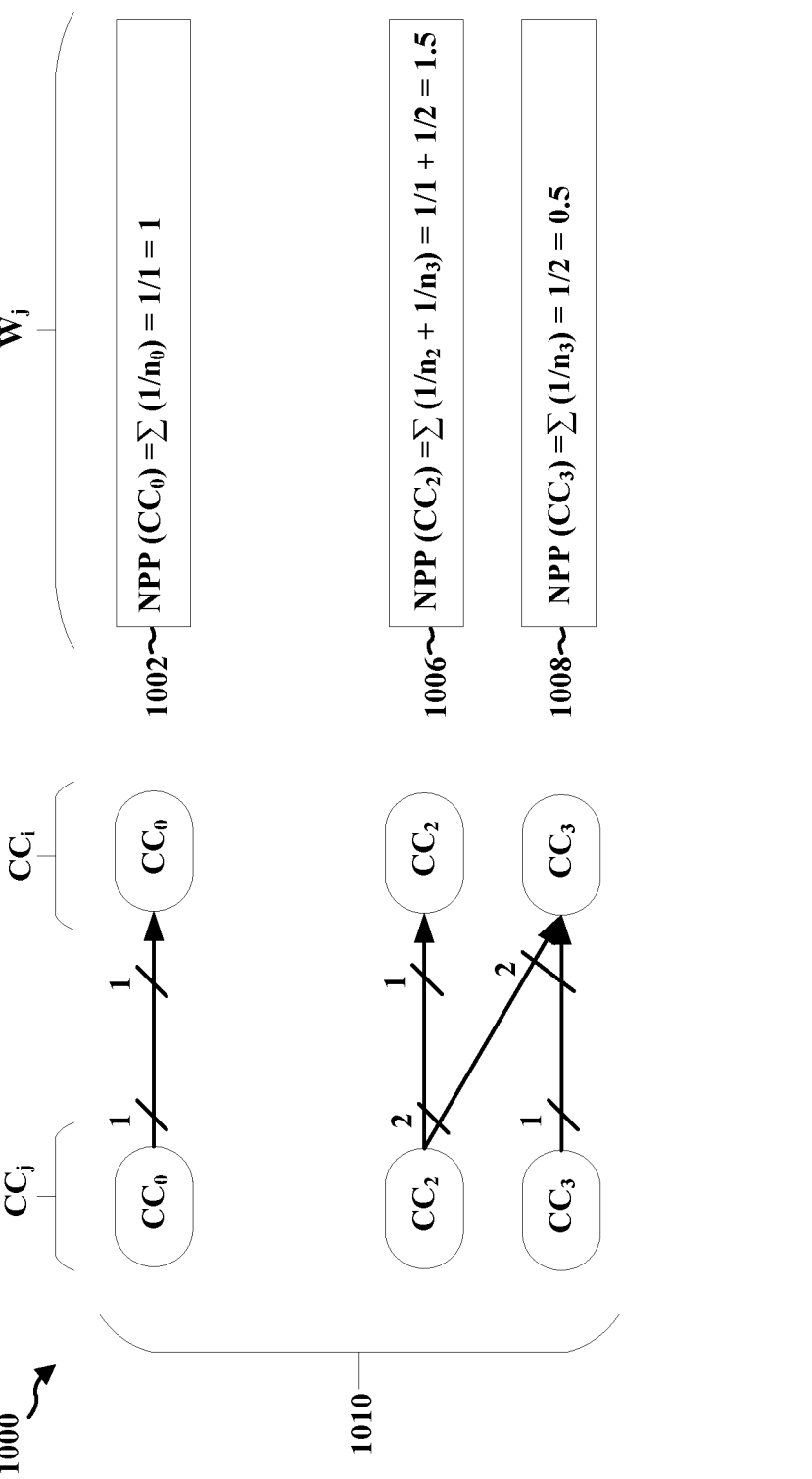
FIG. 10 is a diagram illustrating a logical example of the set of CCs in FIG. 9 after a UE schedules a grant.

FIG. 10 illustrates a logical example 1000 of a set of CCs 1010 configured to schedule at least some of the set of CCs 1010 derived from the set of CCs 910 in FIG. 9. The logical example 1000 illustrates cross CC scheduling for the set of CCs 910 from FIG. 9 after a UE has been scheduled to decode $CC_1$ before the other CCs of the set of CCs 910. The set of CCs 1010 include $CC_0$, $CC_2$, and $CC_3$. The CCs that schedule other CCs may be referred to as $CC_j$, the CCs that are scheduled may be referred to as $CC_i$, and the calculated weight of each NPP may be referred to as $W_j$.

A UE, such as a UE 104 of FIG. 1, may be configured recount the number of grant providers and/or the number of dependencies after the grant from $CC_1$ has been removed from consideration. For example, the UE may determine that $CC_0$ provides 1 grant to $CC_0$, that $CC_2$ provides 2 grants (one grant to $CC_2$ and one grant to $CC_3$), and that $CC_3$ provides 1 grant to $CC_3$. The UE may also determine that that $CC_0$ depends on 1 grant from $CC_0$, that $CC_2$ depends on 1 grant from $CC_2$, and that $CC_3$ receives 2 grants (one grant from $CC_2$ and one grant from $CC_3$). The UE may then be configured to recalculate a node priority per CC (NPP) based on the updated grant dependents and/or the updated number of providers for each grant dependent. A sample NPP calculation is shown for each of the CCs of the set of CCs 1010 to the right. In other words, an NPP calculation 1002 is shown for $CC_0$, an NPP calculation 1006 is shown for $CC_2$, and an NPP calculation 1008 is shown for $CC_3$.

Each $CC_i$ of the set of CCs 1010 may be associated with a number $n_i$ of CCs that schedule the CC. For example, $CC_0$ may be associated with $n_0=1$ CCs ($CC_0$) that schedule $CC_0$. $CC_2$ may now be associated with $n_2=1$ CCs ($CC_2$) that schedule $CC_2$. $CC_3$ may be associated with $n_3=2$ CCs ($CC_2$, $CC_3$) that schedule $CC_3$.

Each $CC_j$ of the set of CCs 1010 may schedule a set of CCs $S_i$. For example, $CC_0$ may schedule a set $S_0$ of $CC_0$. $CC_2$ may schedule a set $S_2$ of $CC_2$ and $CC_3$. $CC_3$ may schedule a set $S_3$ of $CC_3$.

Each $CC_j$ of the set of CCs 910 may be associated with a weight $W_j$ equal to a sum of $1/n_i$ for each $CC_i$ in each set of CCs $S_i$.

For $CC_0$, the NPP calculation 1002 may add one NPP variable since $S_0$ has one CC. The NPP variable may be calculated as $1/n_0$, where no is the number of CCs that provide a grant to $CC_0$. Here, since $1/n_0=1$, the updated weighted value of $CC_0$'s NPP may be 1.

For $CC_2$, the NPP calculation 1006 may add two NPP variables since $S_2$ has two CCs. The NPP variable for the first provision may be calculated as $1/n_2$, where $n_2$ is the number of CCs that provide a grant to $CC_2$, and the NPP variable for the second provision may be calculated as $1/n_3$, where $n_3$ is the number of CCs that provide a grant to $CC_3$. Here, since $1/n_2=1$ and $1/n_3=\frac{1}{2}$, the updated weighted value of $CC_2$'s NPP may be 1.5.

For $CC_3$, the NPP calculation 908 may add one NPP variable since $S_3$ has one CC. The NPP variable for the provision may be calculated as $1/n_3$, where $n_3$ is the number of CCs that provide a grant to $CC_3$. Here, since $1/n_3=\frac{1}{2}$, the updated weighted value of $CC_3$'s NPP may be 0.5.

The updated weighted values may be used to determine a scheduling order for decoding DCI from each CC of the set of CCs 1010, from highest to lowest. Here, a UE with such calculated weighted values may decode the PDCCH for the DCI from $CC_2$ first before decoding data from other CCs of the set of CCs 1010, as $CC_2$ now has the highest weighted value. Such a UE may decode data from $CC_2$ first, eliminating the need for the UE to wait for the grant to $CC_3$ from $CC_2$ before decoding $CC_3$ (after the UE decodes the PDCCH from $CC_2$). The UE may be configured to put a CC to µSleep after the UE decodes each highest NPP CC of the set of CCs 1010. Here, the UE may put $CC_2$ to sleep after the UE decodes $CC_2$ as the first CC decoded of the set of CCs 1010.

The simplified NPP computations shown in FIG. 9 and FIG. 10 may be used for UEs that assume similar processing time and power consumption for each CC of the set of CCs 910 and 1010, respectively. However, a UE may be configured to estimate a processing time of a CC and/or estimate a power consumption of a CC based upon a CC configuration, for example by using the power consumption for a CC configuration 402 or the processing time information for a CC configuration 406. A UE may be configured to use such values to further weight the NPP calculations. For example, a CC estimated to use twice as much power as another CC may have a weight of 2 or 1.2 multiplied to its NPP calculation, and/or a CC estimated to take twice as long as another CC may have a weight of 2 or 1.2 multiplied to its NPP calculation. As such, a UE may be configured to apply a weight to an NPP of a CC based on a calculated power consumption estimate (i.e., power consumption of hardware modules associated with the CC), and/or may be configured to apply a weight to an NPP of a CC based on a calculated processing time estimate (i.e., processing time associated with the CC).

A UE may also be configured to not calculate an NPP for a CC, or to set an NPP for a CC to a lowest value, such as 0. For example, a UE may determine that, from the set of CCs 910 in FIG. 9, $CC_2$ can never be put into a µSleep, and may be configured to set the NPP of $CC_2$ to 0 as a result. A UE may use the calculated order to blind-decode the PDCCH for the DCI for each CC of the set of CCs.

Figure 11:
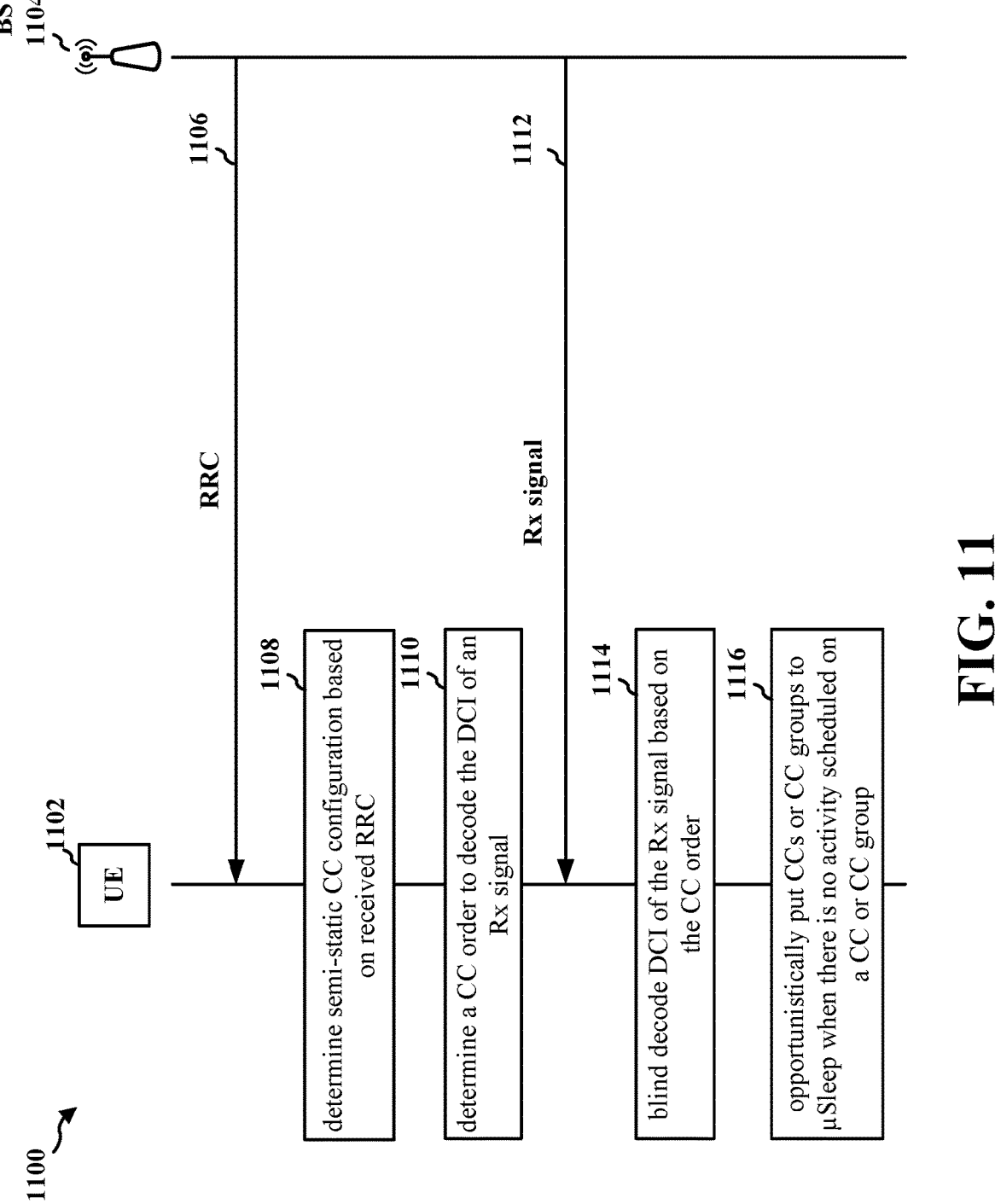
FIG. 11 is a network connection flow diagram that illustrates an example of a UE and a BS configured to optimize a μSleep schedule for a transmission received by the UE.

FIG. 11 shows a network connection flow diagram 1100 that illustrates an example of a UE 1102 configured to optimize a µSleep schedule for a transmission received by the UE 1102 from a BS 1104. The UE 1102 may receive an RRC message 1106 from the BS 1104, which may indicate a static or a semi-static configuration, such as cross CC scheduling of a set of CCs of the UE 1102. At 1108, the UE may determine a semi-static CC configuration based on the received RRC message 1106, such as what CCs may schedule other CCs during a beam transmission. At 1110, the UE may determine a CC order to decode the DCI of the Rx signal, for example based on the calculated weights $W_j$ of FIGS. 9 and 10. The UE may receive an Rx signal 1112 from the BS in accordance with the RRC configuration. At 1114, the UE may be configured to blind decode the PDCCH for the DCI for each CC of the set of CCs of the UE based on the determined CC order. At 1116, the UE may opportunistically put CCs or CC groups to µSleep when there is no activity scheduled on a CC or a CC group, for example by following the µSleep schedule 650 of FIG. 6.

FIG. 12 is a flowchart 1200 of a method of wireless communication. The method may be performed by a UE (e.g., the UE 104; the UE 350; the UE 1102; the apparatus 1504). At 1202, the UE may determine an activity status associated with each CC of a set of CCs based on a PDCCH decoding of DCI. For example, a UE 1102 in FIG. 11 may determine an activity status associated with each CC of the set of CCs 635 in FIG. 6 based on a PDCCH decoding of each DCI, such as PDCCH 632 of $CC_0$ and PDCCH 642 of $CC_n$. The set of CCs may be associated with hardware modules at the UE. For example, the $CC_0$ 630 in FIG. 6 may be representative of the $CC_0$ in FIG. 7, which may have a chain of hardware 716 in FIG. 7. Likewise, the $CC_n$ in FIG. 6 may be representative of the $CC_n$ in FIG. 7, which may have a chain of hardware 718 in FIG. 7. An inactive set of CCs may be determined to have an inactive activity status and an active set of CCs may be determined to have an active activity status. For example, at symbol 4, the $CC_0$ 630 may be determined to have an inactive activity status since symbol 4 is within inactive symbols 636 of $CC_0$ 630 while the $CC_n$ 640 may be determined to have an active activity status since symbol 4 is within active symbols 644 of $CC_n$ 640. The inactive set of CCs may be associated with a first set of hardware modules of the hardware modules and the active set of CCs may be associated with a second set of hardware modules of the hardware modules. For example, at symbol 4 in FIG. 6, a UE 1102 in FIG. 11 may associate the inactive $CC_0$ in FIG. 6 with the chain of hardware 716 in FIG. 7 and may associate the active $CC_n$ in FIG. 6 with the chain of hardware 718 in FIG. 7. The chain of hardware 716 and the chain of hardware 718 in FIG. 7 may include one or more analog modules, such as the analog module 810 or the analog module 812 in FIG. 8, or one or more digital modules, such as the digital module 822 or the digital module 824 in FIG. 8. Further, 1202 may be performed by the µSleep optimization component 198 in FIGS. 1, 3, and 15.

At 1204, the UE may activate a partial sleep mode at the first set of hardware modules at the UE associated with the inactive set of CCs. The inactive set of CCs may not be associated (are unassociated) with the active set of CCs. For example, a UE 1102 in FIG. 11 may activate a µSleep mode at the $CC_0$ in FIG. 6 at symbol 4, which is during the inactive symbols 636 of $CC_0$ 630, while not activating a µSleep mode at the $CC_n$ at symbol 4, which is during the active symbols 644 of $CC_n$ 640. The $CC_0$ 630 in FIG. 6 may be representative of the $CC_0$ in FIG. 7, which may have a chain of hardware 716 in FIG. 7 while the $CC_n$ in FIG. 6 may be representative of the $CC_n$ in FIG. 7, which may have a chain of hardware 718 in FIG. 7. Thus, the UE 1102 in FIG. 11 may activate a µSleep mode at the chain of hardware 716 of the $CC_0$ in FIG. 7 at symbol 4 in FIG. 6, which is during the inactive symbols 636 of $CC_0$ 630, while not activating a µSleep mode at the chain of hardware 718 of the $CC_n$ in FIG. 7 at symbol 4 in FIG. 6, which is during the active symbols 644 of $CC_n$ 640. Further, 1204 may be performed by the µSleep optimization component 198 in FIGS. 1, 3, and 15.

FIG. 13 is a flowchart 1300 of a method of wireless communication. The method may be performed by a UE (e.g., the UE 104; the UE 350; the UE 1102; the apparatus 1504). At 1302, a UE may determine an activity status associated with each CC of a set of CCs based on a PDCCH decoding of DCI. The set of CCs may be associated with hardware modules at the UE. An inactive set of CCs may be determined to have an inactive activity status and an active set of CCs may be determined to have an active activity status. The inactive set of CCs may be associated with a first set of hardware modules of the hardware modules and the active set of CCs may be associated with a second set of hardware modules of the hardware modules. 1302 is similar to 1202 in FIG. 12. To determine the activity status based on the PDCCH decoding of the DCI at 1302 may further include 1306 and 1308.

At 1306, the UE may determine the activity status for each CC of the set of CCs to be the active activity status based on DCI being decoded that schedules communication on the CC. For example, a UE 1102 in FIG. 11 may determine the activity status of the $CC_0$ in FIG. 6 as active during active symbols 634 when the UE decodes DCI, such as PDCCH 632 or PDCCH 642, which schedules communication on $CC_0$ during active symbols 634. Further, 1306 may be performed by the µSleep optimization component 198 in FIGS. 1, 3, and 15.

At 1308, the UE may determine the activity status for each CC of the set of CCs to be the inactive activity status based on no DCI being decoded that schedules communication on the CC. For example, a UE 1102 in FIG. 11 may determine the activity status of the $CC_0$ in FIG. 6 as inactive during inactive symbols 636 when the UE decodes DCI, such as PDCCH 632 or PDCCH 642, which does not schedule communication on $CC_0$ during inactive symbols 636. Further, 1308 may be performed by the µSleep optimization component 198 in FIGS. 1, 3, and 15.

At 1304, a UE may activate a partial sleep mode at the first set of hardware modules associated with the inactive set of CCs. 1304 is similar to 1204 in FIG. 12. To activate the partial sleep mode at the first set of hardware modules associated with the inactive set of CCs at 1304 may further include 1310.

At 1310, a UE may switch off a subset of functionality at the first set of hardware modules. In one aspect, the UE may switch off receiving hardware of the first set of hardware modules for receiving one or more input signals upon activating the partial sleep mode at the first set of hardware modules associated with the inactive set of CCs). For example, a UE 1102 in FIG. 11 may close an input 802 to the analog module 810 and/or close the clock input 829 to the digital modules 822, 824, and 826. In one aspect, the UE may clear pending commands at the first set of hardware modules upon activating the partial sleep mode at the first set of hardware modules associated with the inactive set of CCs). For example, a UE 1102 in FIG. 11 may clear a pending command input 821 to the digital module 822. In one aspect, the UE may switch off the subset of functionality at the first set of hardware modules for n slots upon activating the partial sleep mode at the first set of hardware modules associated with the inactive set of CCs. For example, a UE 1102 in FIG. 11 may activate a µSleep mode at hardware modules of the $CC_0$ 630 in FIG. 6 during the inactive symbols 636 of $CC_0$ 630. Functionality of the hardware modules, such as providing a clock signal to a clock input 829 in FIG. 8 or providing an input 802 to the analog module 810, may be switched off for 2 symbols, during the symbols 3 and 4 of the inactive symbols 636 of $CC_0$ 630. Further, 1310 may be performed by the µSleep optimization component 198 in FIGS. 1, 3, and 15.

At 1312, the UE may, after a specific time period, deactivate the partial sleep mode at the first set of hardware modules associated with the inactive set of CCs. For example, a UE 1102 in FIG. 11 may be configured to deactivate the partial sleep mode at the set of CCs 635 in FIG. 6 in response to receiving a wake-up signal, or in response to decoding a DCI that a slot has a scheduled incoming transmission. The partial sleep mode may be deactivated at a set of hardware modules, such as the chain of hardware 800 in FIG. 8, associated with an inactive set of CCs, such as the inactive set of CCs 635 in FIG. 6 at symbols 654. Further, 1312 may be performed by the µSleep optimization component 198 in FIGS. 1, 3, and 15.

After the UE deactivates the partial sleep mode, the UE may then determine an inactive activity status associated with a CC of the set of CCs at 1302, and may then activate the partial sleep mode at 1304 in response to determining that a CC of the set of CCs is inactive.

Figure 14:
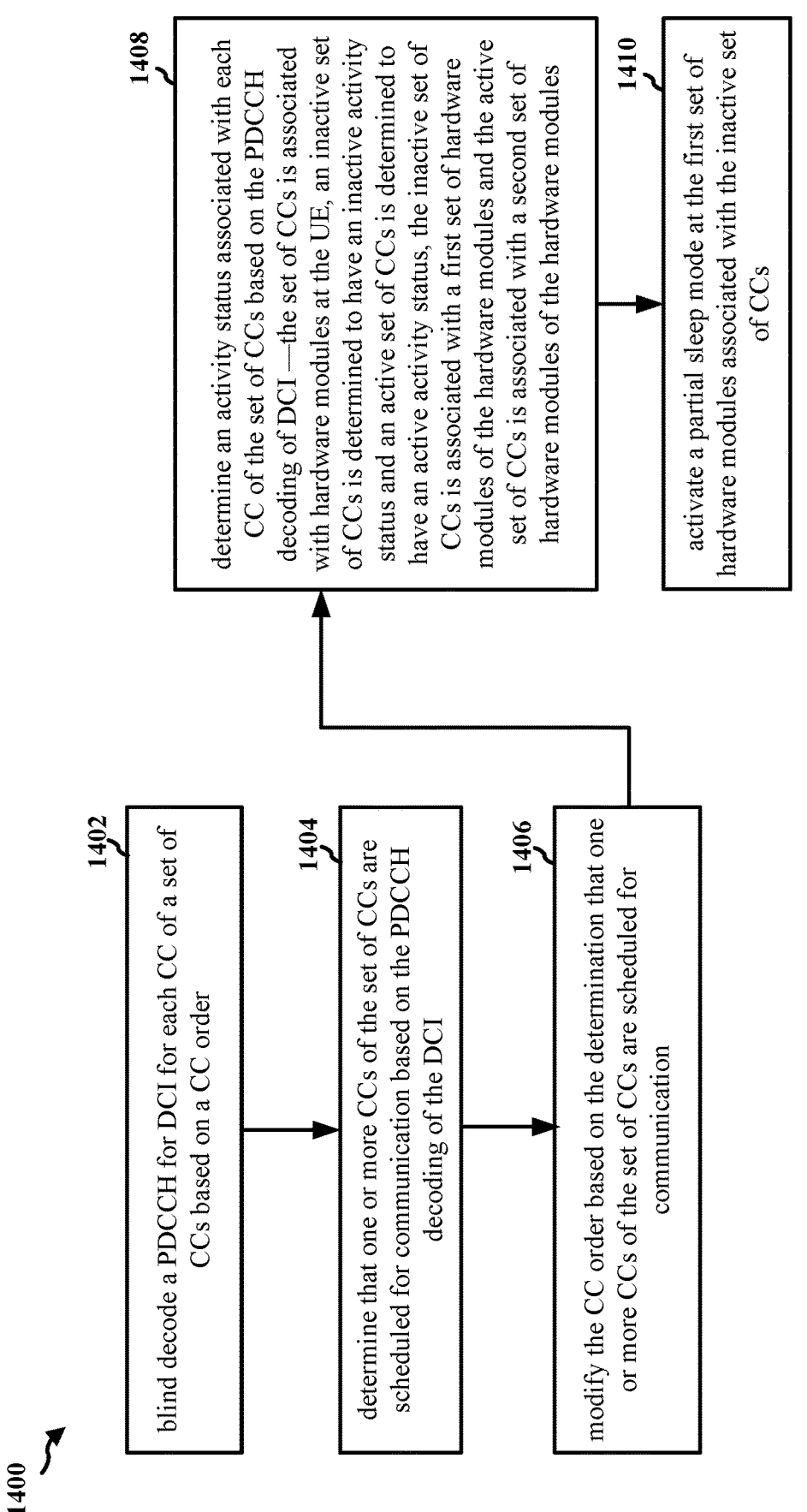
FIG. 14 is another flowchart of a method of wireless communication.

FIG. 14 is a flowchart 1400 of a method of wireless communication. The method may be performed by a UE (e.g., the UE 104; the UE 350; the UE 1102; the apparatus 1504). At 1402, the UE may blind decode a PDCCH for DCI for each CC of a set of CCs based on a CC order. For example, a UE 1102 in FIG. 11 may blind decode the PDDCH for the DCI of each of the set of CCs 635 in FIG. 6, such as the PDCCH 632 and PDDCH 642. The order of decoding the PDDCH may be based on the results of the NPP calculations 902, 904, 906, and 908 in FIG. 9. Further, 1402 may be performed by the µSleep optimization component 198 in FIGS. 1, 3, and 15.

At 1404, the UE may determine that one or more CCs of the set of CCs are scheduled for communication based on the PDCCH decoding of the DCI. For example, a UE 1102 in FIG. 11 may determine that one or more CCs of the set of CCs 635 in FIG. 6 may be scheduled for communication based on the PDCCH decoding of the DCI for the set of CCs 635, such as PDCCH 632 and the PDCCH 642. Further, 1404 may be performed by the µSleep optimization component 198 in FIGS. 1, 3, and 15.

At 1406, the UE may modify the CC order based on the determination that one or more CCs of the set of CCs are scheduled for communication. For example, a UE 1102 in FIG. 11 may modify the CC order based on the NPP calculations 902, 904, 906, and 908 in FIG. 9 with the updated NPP calculations 1002, 1006, and 1006 in FIG. 10 based on the determination that $CC_1$ of the set of CCs 910 in FIG. 9 is scheduled for communication. Further, 1406 may be performed by the µSleep optimization component 198 in FIGS. 1, 3, and 15.

The UE may proceed to 1408, similar to 1202 in FIG. 12, and may further proceed to 1410, similar to 1204 in FIG. 12.

Figure 15:
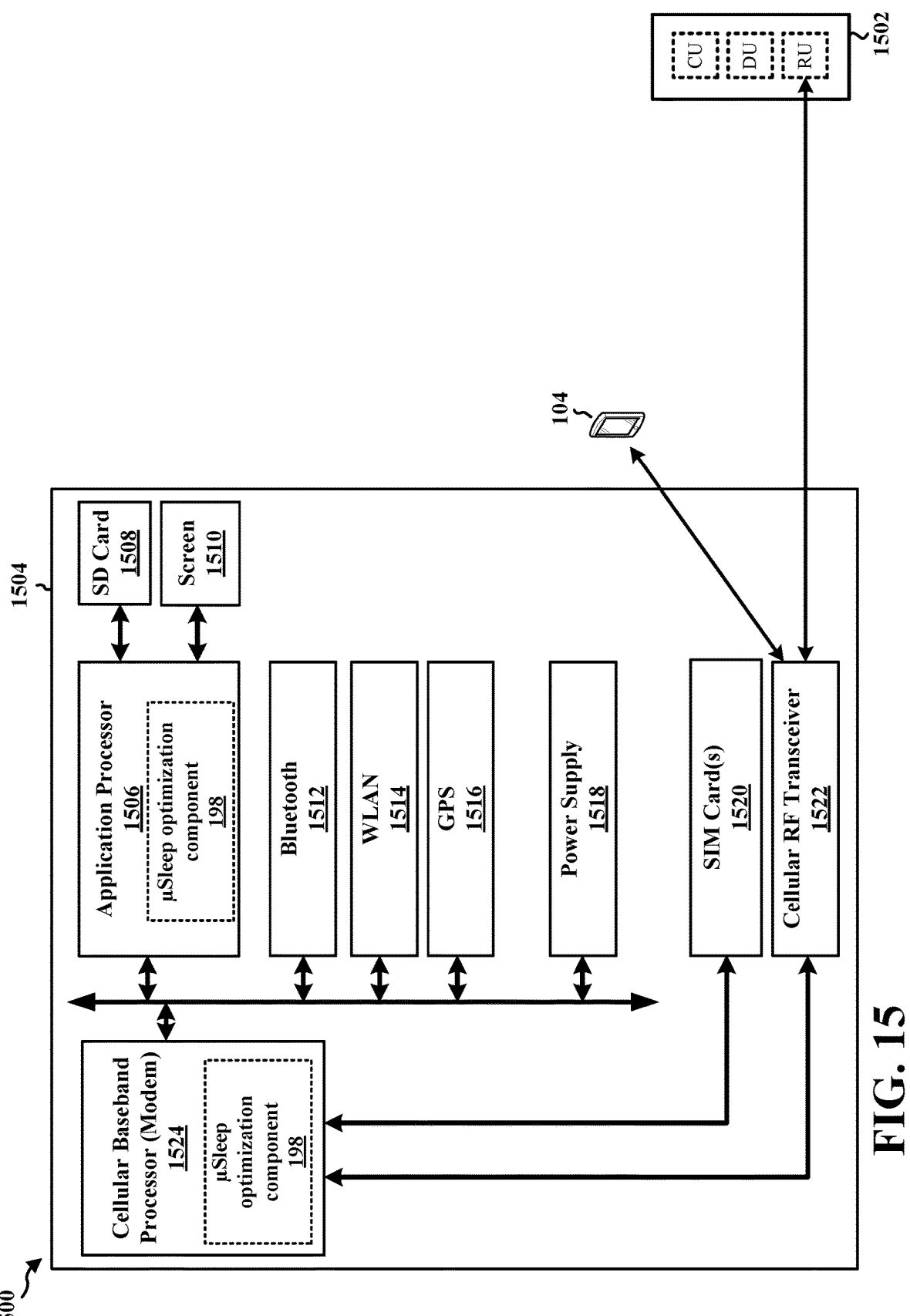
FIG. 15 is a diagram illustrating an example of a hardware implementation for an example apparatus.

FIG. 15 is a diagram 1500 illustrating an example of a hardware implementation for an apparatus 1504 and a network entity 1502. The apparatus 1504 may be a UE, a component of a UE, or may implement UE functionality. The network entity 1502 may be a BS, a component of a BS, or may implement BS functionality. In some aspects, the apparatus 1504 may include a cellular baseband processor 1524 (also referred to as a modem) coupled to a cellular RF transceiver 1522. In some aspects, the apparatus 1504 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1524 communicates through the cellular RF transceiver 1522 with the UE 104 and/or with an RU associated with the network entity 1502. The RU is either part of the network entity 1502 or is in communication with the network entity 1502. The network entity 1502 may include one or more of the CU, DU, and the RU. The cellular baseband processor 1524 and the application processor 1506 may each include a computer-readable medium/memory. Each computer-readable medium/memory may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the Tx processor 368, the Rx processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 is configured to configured to optimize μSleep of CCs of the apparatus 1504, e.g., as described in connection with 1202 and 1204 in FIG. 12, 1302, 1304, 1306, 1308, or 1310 in FIG. 13, or 1402, 1406, 1408, or 1410 in FIG. 14. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for determining an activity status associated with each CC of a set of CCs based on a PDCCH decoding of DCI, the set of CCs being associated with hardware modules at the UE, an inactive set of CCs being determined to have an inactive activity status and an active set of CCs being determined to have an active activity status, the inactive set of CCs being associated with a first set of hardware modules of the hardware modules and the active set of CCs being associated with a second set of hardware modules of the hardware modules, means for activating a partial sleep mode at the first set of hardware modules associated with the inactive set of CCs, means for blind decoding the PDCCH for the DCI for each CC of the set of CCs based on a CC order, means for determining that one or more CCs of the set of CCs are scheduled for communication based on the PDCCH decoding of the DCI, and means for modifying the CC order based on the determination that one or more CCs of the set of CCs are scheduled for communication. The means may be the component 198 of the apparatus 1504 configured to perform the functions recited by the means. As described supra, the apparatus 1504 may include the Tx processor 368, the Rx processor 356, and the controller/processor 359. As such, in one configuration, the means may be the Tx processor 368, the Rx processor 356, and/or the controller/processor 359 configured to perform the functions recited by the means.

The apparatus may include additional components that perform each of the blocks of the algorithm in the flowcharts of FIGS. 11 to 14. As such, each block in the flowcharts of FIGS. 11 to 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory. The at least one processor may be configured to determine an activity status associated with each CC of a set of CCs based on a PDCCH decoding of DCI. The set of CCs may be associated with hardware modules at the UE. An inactive set of CCs may be determined to have an inactive activity status and an active set of CCs may be determined to have an active activity status. The inactive set of CCs may be associated with a first set of hardware modules of the hardware modules and the active set of CCs may be associated with a second set of hardware modules of the hardware modules. The at least one processor may be further configured to activate a partial sleep mode at the first set of hardware modules associated with the inactive set of CCs.

Aspect 2 is the apparatus of aspect 1, where the activity status may be determined for each CC group of a set of CC groups. An inactive set of CC groups may be determined to have the inactive activity status and an active set of CC groups may be determined to have the active activity status. The partial sleep mode may be activated at the first set of hardware modules associated with the inactive set of CC groups, each CC group including one or more CCs.

Aspect 3 is the apparatus of any of aspects 1 and 2, where to determine the activity status based on the PDCCH decoding of the DCI, the at least one processor may be configured to (a) determine the activity status for each CC of the set of CCs to be the active activity status based on DCI being decoded that schedules communication on the CC, and (b) determine the activity status for each CC of the set of CCs to be the inactive activity status based on no DCI being decoded that schedules communication on the CC.

Aspect 4 is the apparatus of any of aspects 1 to 3, where to activate the partial sleep mode at the first set of hardware modules at the UE may include switching off a subset of functionality at the first set of hardware modules.

Aspect 5 is the apparatus of aspect 4, where the switching off the subset of functionality at the first set of hardware modules may include at least one of switching off receiving hardware of the first set of hardware modules for receiving one or more input signals or clearing pending commands at the first set of hardware modules.

Aspect 6 is the apparatus of aspect 5, where the one or more input signals may be clock input signals.

Aspect 7 is the apparatus of any of aspects 4 to 6, where the subset of functionality at the first set of hardware modules may be switched off for n slots upon activating the partial sleep mode at the first set of hardware modules associated with the inactive set of CCs.

Aspect 8 is the apparatus of any of aspects 1 to 7, where the at least one processor may be further configured to blind decode a PDCCH of DCI for each CC of the set of CCs based on a CC order.

Aspect 9 is the apparatus of aspect 8, where each $CC_i$ of the set of CCs may be associated with a number $n_i$ of CCs that schedule the $CC_i$. Each $CC_j$ of the set of CCs may schedule a set of CCs $S_i$. Each $CC_j$ of the set of CCs may be associated with a weight $W_j$ equal to a sum of $1/n_i$ for each $CC_i$ in each set of CCs $S_j$. The CC order may be based on the weight $W_j$ for each $CC_j$ of the set of CCs.

Aspect 10 is the apparatus of any of aspects 8 to 9, where the at least one processor may be further configured to determine that one or more CCs of the set of CCs are scheduled for communication based on the PDCCH decoding of the DCI. The at least one processor may be further configured to modify the CC order based on the determination that one or more CCs of the set of CCs are scheduled for communication.

Aspect 11 is the apparatus of any of aspects 8 to 10, where the CC order may be based on a power consumption of the hardware modules associated with each CC of the set of CCs.

Aspect 12 is the apparatus of any of aspects 8 to 11, where the CC order may be based on a CC processing time associated with each CC of the set of CCs.

Aspect 13 is the apparatus of any of aspects 1 to 12, where the first set of hardware modules is not associated with the active set of CCs and does not include the second set of hardware modules.

Aspect 14 is the apparatus of any of aspects 1 to 13, where, after a specific time period, the at least one processor may be further configured to (a) deactivate the partial sleep mode at the first set of hardware modules associated with the inactive set of CCs, (b) redetermine the activity status associated with each CC of the set of CCs, and (c) reactivate the partial sleep mode based on the redetermination of the activity status.

Aspect 15 is the apparatus of any of aspects 1 to 14, further including a transceiver coupled to the at least one processor, where the activity status may be determined by the DCI received by the transceiver.

Aspect 16 is a method of wireless communication at a UE, including determining an activity status associated with each CC of a set of CCs based on a PDCCH decoding of DCI. The set of CCs may be associated with hardware modules at the UE. An inactive set of CCs may be determined to have an inactive activity status and an active set of CCs may be determined to have an active activity status. The inactive set of CCs may be associated with a first set of hardware modules of the hardware modules and the active set of CCs may be associated with a second set of hardware modules of the hardware modules. The method may also include activating a partial sleep mode at the first set of hardware modules associated with the inactive set of CCs.

Aspect 17 is a method of aspect 16, where the activity status may be determined for each CC group of a set of CC groups. An inactive set of CC groups may be determined to have the inactive activity status and an active set of CC groups may be determined to have the active activity status. The partial sleep mode may be activated at the first set of hardware modules associated with the inactive set of CC groups where each CC group including one or more CCs.

Aspect 18 is the method of any of aspects 16 to 17, where determining the activity status based on the PDCCH decoding of DCI may include (a) determining the activity status for each CC of the set of CCs to be the active activity status based on DCI being decoded that schedules communication on the CC, and (b) determining the activity status for each CC of the set of CCs to be the inactive activity status based on no DCI being decoded that schedules communication on the CC.

Aspect 19 is the method of any of aspects 16 to 18, where the activating the partial sleep mode at the first set of hardware modules at the UE may include switching off a subset of functionality at the first set of hardware modules.

Aspect 20 is the method of aspect 19, where the switching off the subset of functionality at the first set of hardware modules may include at least one of switching off receiving hardware of the first set of hardware modules for receiving one or more input signals or clearing pending commands at the first set of hardware modules.

Aspect 21 is the method of aspect 20, where the one or more input signals may be clock input signals.

Aspect 22 is the method of any of aspects 19 to 21, wherein the subset of functionality at the first set of hardware modules may be switched off for n slots upon activating the partial sleep mode at the first set of hardware modules associated with the inactive set of CCs.

Aspect 23 is the method of any of aspects 16 to 22, further including blind decoding a PDDCH of DCI for each CC of the set of CCs based on a CC order.

Aspect 24 is the method of aspect 23, where each $CC_i$ of the set of CCs may be associated with a number $n_i$ of CCs that schedule the $CC_i$. Each $CC_j$ of the set of CCs may schedule a set of CCs $S_i$. Each $CC_j$ of the set of CCs may be associated with a weight $W_j$ equal to a sum of $1/n_i$ for each $CC_i$ in each set of CCs $S_i$. The CC order may be based on the weight $W_j$ for each $CC_j$ of the set of CCs.

Aspect 25 is the method of any of aspects 23 to 24, further including determining that one or more CCs of the set of CCs are scheduled for communication based on the PDCCH decoding of the DCI. The method may further include modifying the CC order based on the determination that one or more CCs of the set of CCs are scheduled for communication.

Aspect 26 is the method of any of aspects 23 to 25, where the CC order may be based on a power consumption of the hardware modules associated with each CC of the set of CCs.

Aspect 27 is the method of any of aspects 23 to 26, where the CC order may be based on a CC processing time associated with each CC of the set of CCs.

Aspect 28 is the method of any of aspects 16 to 27, where the first set of hardware modules may not be associated with the active set of CCs and may not include the second set of hardware modules.

Aspect 29 is the method of any of aspects 16 to 28, further including, after a specific time period, (a) deactivating the partial sleep mode at the first set of hardware modules associated with the inactive set of CCs, (b) redetermining the activity status associated with each CC of the set of CCs, and reactivating the partial sleep mode based on the redetermination of the activity status.

Aspect 30 is an apparatus for wireless communication including means for implementing any of aspects 16 to 29.

Aspect 31 is a computer-readable medium storing computer executable code, where the code when executed by a processor causes the processor to implement any of aspects 16 to 29.

What is claimed is:

1. An apparatus for wireless communication at a user equipment (UE) comprising:
   memory; and
   at least one processor coupled to the memory and configured to:
   determine, for an inactive set of component carriers (CCs) of a plurality of CCs, a first set of active symbols and a first set of inactive symbols based on a physical downlink control channel (PDCCH) decoding of downlink control information (DCI), the plurality of CCs being associated with a plurality of hardware modules for a wideband chain at the UE, each CC of the plurality of CCs being associated with a set of hardware modules for a narrowband chain of the plurality of hardware modules for the wideband chain, the inactive set of CCs being associated with a first set of hardware modules of the plurality of hardware modules;
   determine, for an active set of CCs of the plurality of CCs, a second set of active symbols and a second set of inactive symbols based on the PDCCH decoding of the DCI, the active set of CCs being associated with a second set of hardware modules of the plurality of hardware modules, a first number of the first set of active symbols being less than a second number of the second number of active symbols, a third number of the first set of inactive symbols being greater than a fourth number of the second set of inactive symbols;
   activate a sleep mode at the first set of hardware modules associated with the inactive set of CCs during an overlap of the first set of inactive symbols and the second set of active symbols, the second set of hardware modules not having the sleep mode activated during the overlap of the first set of inactive symbols and the second set of active symbols; and
   activate the sleep mode at the first set of hardware modules and the second set of hardware modules during the second set of inactive symbols.

2. The apparatus of claim 1, wherein, to determine, for the inactive set of CCs of the plurality of CCs, the first set of active symbols and the second set of active symbols based on the PDCCH decoding of the DCI, the at least one processor is configured to:
   determine, for each CC of the inactive set of CCs, the first set of active symbols to be active based on DCI being decoded that schedules communication on the CC; and
   determine, for each CC of the inactive set of CCs, the first set of inactive symbols to be inactive based on no DCI being decoded that schedules communication on the CC.

3. The apparatus of claim 1, wherein, to activate the sleep mode at the first set of hardware modules, the at least one processor is configured to:
   switch off a subset of functionality at the first set of hardware modules.

4. The apparatus of claim 3, wherein, to switch off the subset of functionality at the first set of hardware modules, the at least one processor is configured to:
   switch off receiving hardware of the first set of hardware modules for receiving one or more input signals; or
   clear pending commands at the first set of hardware modules.

5. The apparatus of claim 4, wherein the one or more input signals comprise clock input signals.

6. The apparatus of claim 3, wherein, to switch off the subset of functionality at the first set of hardware modules, the at least one processor is configured to:

switch off the subset of functionality at the first set of hardware modules for n slots upon activating the sleep mode at the first set of hardware modules associated with the inactive set of CCs.

7. The apparatus of claim 1, wherein the at least one processor is further configured to:

blind decode the DCI for each CC of the plurality of CCs based on a CC order.

8. The apparatus of claim 7, wherein:

each $CC_i$ of the plurality of CCs is associated with a number $n_i$ of CCs that schedule the $CC_i$;

each $CC_j$ of the plurality of CCs schedules a set of CCs $S_j$;

each $CC_j$ of the plurality of CCs is associated with a weight $W_j$ equal to a sum of $1/n_i$ for each $CC_i$ in each set of CCs $S_j$; and the CC order is based on the weight $W_j$ for each $CC_j$ of the plurality of CCs.

9. The apparatus of claim 7, wherein the at least one processor is further configured to:

determine that one or more CCs of the plurality of CCs are scheduled for communication based on the PDCCH decoding of the DCI; and modify the CC order based on the determination that one or more CCs of the plurality of CCs are scheduled for communication.

10. The apparatus of claim 7, wherein the CC order is based on a power consumption of the plurality of hardware modules associated with each CC of the plurality of CCs.

11. The apparatus of claim 7, wherein the CC order is based on a CC processing time associated with each CC of the plurality of CCs.

12. The apparatus of claim 1, wherein the first set of hardware modules is not associated with the active set of CCs and does not include the second set of hardware modules.

13. The apparatus of claim 1, wherein, after a specific time period, the at least one processor is further configured to:

deactivate the sleep mode at the first set of hardware modules associated with the inactive set of CCs;

determine, for each CC of the inactive set of CCs, a fifth set of active symbols and a sixth set of inactive symbols; and reactivate the sleep mode at the first set of hardware modules associated with the inactive set of CCs based on the determined fifth set of active symbols and the sixth set of inactive symbols.

14. The apparatus of claim 1, further comprising a transceiver coupled to the at least one processor, wherein the at least one processor is configured to:

receive, via the transceiver, the DCI.

15. A method of wireless communication at a user equipment (UE), comprising:

determining, for an inactive set of component carriers (CCs) of a plurality of CCs, a first set of active symbols and a first set of inactive symbols based on a physical downlink control channel (PDCCH) decoding of downlink control information (DCI), the plurality of CCs being associated with a plurality of hardware modules for a wideband chain at the UE, each CC of the plurality of CCs being associated with a set of hardware modules for a narrowband chain of the plurality of hardware modules for the wideband chain, the inactive set of CCs being associated with a first set of hardware modules of the plurality of hardware modules;

determining, for an active set of CCs of the plurality of CCs, a second set of active symbols and a second set of inactive symbols based on the PDCCH decoding of the DCI, the active set of CCs being associated with a second set of hardware modules of the plurality of hardware modules, a first number of the first set of active symbols being less than a second number of the second number of active symbols, a third number of the first set of inactive symbols being greater than a fourth number of the second set of inactive symbols;

activating a sleep mode at the first set of hardware modules associated with the inactive set of CCs during an overlap of the first set of inactive symbols and the second set of active symbols, the second set of hardware modules not having the sleep mode activated during the overlap of the first set of inactive symbols and the second set of active symbols; and activating the sleep mode at the first set of hardware modules and the second set of hardware modules during the second set of inactive symbols.

16. The method of claim 15, wherein determining, for the inactive set of CCs of the plurality of CCs, the first set of active symbols and the second set of active symbols based on the PDCCH decoding of the DCI comprises:

determining, for each CC of the inactive set of CCs, the first set of active symbols to be active based on DCI being decoded that schedules communication on the CC; and determining, for each CC of the inactive set of CCs, the first set of inactive symbols to be inactive based on no DCI being decoded that schedules communication on the CC.

17. The method of claim 15, wherein activating the sleep mode at the first set of hardware modules comprises:

switching off a subset of functionality at the first set of hardware modules.

18. The method of claim 17, wherein switching off the subset of functionality at the first set of hardware modules comprises:

switching off receiving hardware of the first set of hardware modules for receiving one or more input signals; or clearing pending commands at the first set of hardware modules.

19. The method of claim 18, wherein the one or more input signals comprise clock input signals.

20. The method of claim 17, wherein switching off the subset of functionality at the first set of hardware modules comprises:

switching off the subset of functionality at the first set of hardware modules for n slots upon activating the sleep mode at the first set of hardware modules associated with the inactive set of CCs.

21. The method of claim 15, further comprising:

blind decoding the DCI for each CC of the plurality of CCs based on a CC order.

22. The method of claim 21, wherein:

each $CC_i$ of the plurality of CCs is associated with a number $n_i$ of CCs that schedule the $CC_i$;

each $CC_j$ of the plurality of CCs schedules a set of CCs $S_j$;

each $CC_j$ of the plurality of CCs is associated with a weight $W_j$ equal to a sum of $1/n_i$ for each $CC_i$ in each set of CCs $S_j$; and the CC order is based on the weight $W_j$ for each $CC_j$ of the plurality of CCs.

23. The method of claim 21, further comprising:

determining that one or more CCs of the plurality of CCs are scheduled for communication based on the PDCCH decoding of the DCI; and modifying the CC order based on the determination that one or more CCs of the plurality of CCs are scheduled for communication.

24. The method of claim 21, wherein the CC order is based on a power consumption of the plurality of hardware modules associated with each CC of the plurality of CCs.

25. An apparatus for wireless communication at a user equipment (UE), comprising:

means for determining, for an inactive set of component carriers (CCs) of a plurality of CCs, a first set of active symbols and a first set of inactive symbols based on a physical downlink control channel (PDCCH) decoding of downlink control information (DCI), the plurality of CCs being associated with a plurality of hardware modules for a wideband chain at the UE, each CC of the plurality of CCs being associated with a set of hardware modules for a narrowband chain of the plurality of hardware modules for the wideband chain, the inactive set of CCs being associated with a first set of hardware modules of the plurality of hardware modules;

means for determining, for an active set of CCs of the plurality of CCs, a second set of active symbols and a second set of inactive symbols based on the PDCCH decoding of the DCI, the active set of CCs being associated with a second set of hardware modules of the plurality of hardware modules, a first number of the first set of active symbols being less than a second number of the second number of active symbols, a third number of the first set of inactive symbols being greater than a fourth number of the second set of inactive symbols;

means for activating a sleep mode at the first set of hardware modules associated with the inactive set of CCs during an overlap of the first set of inactive symbols and the second set of active symbols, the second set of hardware modules not having the sleep mode activated during the overlap of the first set of inactive symbols and the second set of active symbols; and means for activating the sleep mode at the first set of hardware modules and the second set of hardware modules during the second set of inactive symbols.

26. The apparatus of claim 25, further comprising:

means for blind decoding the DCI for each CC of the plurality of CCs based on a CC order, wherein each $CC_i$ of the plurality of CCs is associated with a number $n_i$ of CCs that schedule the $CC_i$, wherein each $CC_j$ of the plurality of CCs schedules a set of CCs $S_j$, wherein each $CC_j$ of the plurality of CCs is associated with a weight $W_j$ equal to a sum of $1/n_i$ for each $CC_i$ in each set of CCs $S_j$, and wherein the CC order is based on the weight $W_j$ for each $CC_j$ of the plurality of CCs.

27. The apparatus of claim 25, further comprising:

means for receiving, via a transceiver, the DCI.

28. A non-transitory computer-readable medium storing computer executable code at a user equipment (UE), the code, when executed by a processor, causes the processor to:

determine, for an inactive set of component carriers (CCs) of a plurality of CCs, a first set of active symbols and a first set of inactive symbols based on a physical downlink control channel (PDCCH) decoding of downlink control information (DCI), the plurality of CCs being associated with a plurality of hardware modules for a wideband chain at the UE, each CC of the plurality of CCs being associated with a set of hardware modules for a narrowband chain of the plurality of hardware modules for the wideband chain, the inactive set of CCs being associated with a first set of hardware modules of the plurality of hardware modules;

determine, for an active set of CCs of the plurality of CCs, a second set of active symbols and a second set of inactive symbols based on the PDCCH decoding of the DCI, the active set of CCs being associated with a second set of hardware modules of the plurality of hardware modules, a first number of the first set of active symbols being less than a second number of the second number of active symbols, a third number of the first set of inactive symbols being greater than a fourth number of the second set of inactive symbols;

activate a sleep mode at the first set of hardware modules associated with the inactive set of CCs during an overlap of the first set of inactive symbols and the second set of active symbols, the second set of hardware modules not having the sleep mode activated during the overlap of the first set of inactive symbols and the second set of active symbols; and activate the sleep mode at the first set of hardware modules and the second set of hardware modules during the second set of inactive symbols.

\* \* \* \* \*